US010142296B2

(12) United States Patent
Salek et al.

(10) Patent No.: US 10,142,296 B2
(45) Date of Patent: Nov. 27, 2018

(54) SYSTEMS AND METHODS FOR IMPROVING PRECISION OF A LOCATION SENSOR

(71) Applicant: Google Inc., Mountain View, CA (US)

(72) Inventors: Mahyar Salek, San Jose, CA (US); Philip McDonnell, Belmont, CA (US); Amin Charaniya, Santa Clara, CA (US); Shobhit Saxena, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 251 days.

(21) Appl. No.: 15/043,394

(22) Filed: Feb. 12, 2016

(65) Prior Publication Data

US 2017/0026345 A1   Jan. 26, 2017

Related U.S. Application Data

(63) Continuation-in-part of application No. 14/808,634, filed on Jul. 24, 2015, now Pat. No. 9,716,697.

(51) Int. Cl.
*H04L 9/32* (2006.01)
*H04L 29/06* (2006.01)
(Continued)

(52) U.S. Cl.
CPC ........ *H04L 63/0428* (2013.01); *H04L 9/0872* (2013.01); *H04L 63/0478* (2013.01);
(Continued)

(58) Field of Classification Search
CPC . H04L 63/04; H04L 63/0428; H04L 63/0478; H04L 9/0872; H04L 2209/46;
(Continued)

(56) References Cited

U.S. PATENT DOCUMENTS 4,868,119 A   9/1989   Clark et al.
6,952,769 B1   10/2005   Dubey et al.
(Continued)

FOREIGN PATENT DOCUMENTS

GB   2 469 673   10/2010

OTHER PUBLICATIONS

International Search Report and the Written Opinion of the International Searching Authority for PCT Application PCT/US2016/042925 dated Oct. 6, 2016.
(Continued)

*Primary Examiner* — Shewaye Gelagay
*Assistant Examiner* — Amie C Lin
(74) *Attorney, Agent, or Firm* — Foley and Lardner LLP

(57) ABSTRACT

Systems and methods of cryptographically protecting location data transferred between servers via a network to tune a location engine are described herein. A first encryption module determines a first hash value for each location determination, encrypts the first hash value for each location determination using a first encryption protocol to generate a first encrypted data set, and transmits the first encrypted data set to a server. The first encryption module receives, from the server, a second encrypted data set with second hash values generated by a second encryption module of the server using a second encryption protocol. The first encryption module creates a first double encrypted data set from the second encrypted data set. A tuner compares the first double encrypted data set with a second double encrypted data set received from the server to adjust the location engine.

20 Claims, 5 Drawing Sheets

(51) Int. Cl.
*H04W 12/08* (2009.01)
*H04W 4/021* (2018.01)
*H04L 9/08* (2006.01)
*H04W 12/02* (2009.01)

(52) U.S. Cl.
CPC ........... *H04W 4/022* (2013.01); *H04W 12/08* (2013.01); *H04L 2209/46* (2013.01); *H04W 12/02* (2013.01)

(58) Field of Classification Search
CPC ....... H04W 4/022; H04W 4/02; H04W 12/02; H04W 12/08
See application file for complete search history.

(56) References Cited

U.S. PATENT DOCUMENTS

| | | | |
|---|---|---|---|
| 8,429,086 B2 | 4/2013 | Babitch et al. | |
| 8,572,379 B2 | 10/2013 | Cancedda | |
| 8,634,853 B2 | 1/2014 | Bogatin | |
| 8,745,390 B1* | 6/2014 | Atwood | H04L 63/061 713/169 |
| 9,349,026 B2 | 5/2016 | Gianniotis et al. | |
| 2006/0077095 A1* | 4/2006 | Tucker | G01C 15/00 342/357.48 |
| 2007/0038674 A1* | 2/2007 | Bejar | G06F 21/6218 |
| 2009/0037492 A1 | 2/2009 | Baitalmal et al. | |
| 2010/0318858 A1 | 12/2010 | Essawi et al. | |
| 2012/0330722 A1 | 12/2012 | Volpe et al. | |
| 2013/0251150 A1* | 9/2013 | Chassagne | G01S 1/042 380/270 |
| 2013/0326220 A1 | 12/2013 | Connelly et al. | |
| 2014/0006097 A1 | 1/2014 | Groarke | |
| 2015/0149763 A1 | 5/2015 | Kamara | |
| 2017/0161521 A1 | 6/2017 | Fontecchio | |

OTHER PUBLICATIONS

International Search Report and Written Opinion for related PCT application No. PCT/US2016/042921, dated Sep. 29, 2016.
U.S. Office Action on U.S. Appl. No. 14/808,634 dated Dec. 22, 2016.
U.S. Notice of Allowance on U.S. Appl. No. 14/808,634 dated Mar. 31, 2017.
U.S. Notice of Allowance on U.S. Appl. No. 15/650,099 dated Jan. 23, 2018.
U.S. Office Action on U.S. Appl. No. 15/650,099 dated Oct. 25, 2017.

* cited by examiner

SYSTEMS AND METHODS FOR IMPROVING PRECISION OF A LOCATION SENSOR

CROSS-REFERENCES TO RELATED APPLICATIONS

This application claims the benefit of priority under 35 U.S.C. § 120 as a continuation in-part of U.S. patent application Ser. No. 14/808,634, filed Jul. 24, 2015, which is incorporated by reference herein in its entirety.

BACKGROUND OF THE DISCLOSURE

In a computer networked environment such as the Internet, entities such as people or companies can provide information for public display on online content through web servers. When a client device sends requests for online content to the entity's various web servers and receives online content from the entity's respective web server, the web server can maintain a log of such computing device network activity and interactions according to various formats.

BRIEF SUMMARY OF THE DISCLOSURE

At least one aspect is directed to a system that cryptographically protects location data transferred between a plurality of servers via a computer network to tune a location engine. The system can include a bridging module, a first encryption module, a communication interface, and a tuner. The bridging module, first encryption module, communication interface and tuner can be executed by one or more processors of a data processing system. The bridging module can retrieve, from a location database stored in memory, a plurality of location determinations made by the location engine of the data processing system. Each location determination can be associated with a respective first identifier. The bridging module can map each respective first identifier to a respective second identifier using a mapping function. The first encryption module can determine a first hash value for each location determination using a first hash function applied to a tuple formed of the second identifier and a timestamp of each location determination. The first encryption module can encrypt the first hash value for each location determination using a first encryption protocol to generate a first encrypted data set. The communication interface can transmit, via the computer network, the first encrypted data set to one or more servers. The servers can process electronic transactions. The communication interface can receive, from the one or more servers, a second encrypted data set comprising second hash values generated by a second encryption module for the electronic transactions. Each of the second hash values can be generated by the second encryption module via application of a second hash function to a tuple formed of an identifier and a timestamp of each of the electronic transactions. The second encrypted data set can be encrypted by the second encryption module with a second encryption protocol. The first encryption protocol and the second encryption protocol are commutative encryption protocols. The first encryption module can use the first encryption protocol to encrypt the second encrypted data set received from the one or more servers to generate a first double encrypted data set. The communication interface can receive, from the one or more servers, a second double encrypted data set generated by the second encryption module via application of the second encryption protocol to the first encrypted data set transmitted by the data processing system to the one or more servers. the tuner can compare the first double encrypted data set with the second double encrypted data set to determine a precision metric and a recall metric based on a total number of correct location determinations, a total number of location determinations, and a total number of actual location event. The tuner can adjust a tuning parameter of the location engine based on at least one of the precision metric or the recall metric.

At least one aspect is directed to a method of cryptographically protecting location data transferred between a plurality of servers via a computer network to tune a location engine. The method can include retrieving, by a bridging module executed by one or more processors of a data processing system, a plurality of location determinations made by the location engine of the data processing system. Each location determination can be associated with a respective first identifier, and the bridging module can receive the plurality of location determines from a location database stored in memory. The method can include the bridging module mapping each respective first identifier to a respective second identifier using a mapping function. The method can include a first encryption module executed by the one or more processors determining a first hash value for each location determination using a first hash function applied to a tuple formed of the second identifier and a timestamp of each location determination. The method can include the first encryption module encrypting the first hash value for each location determination using a first encryption protocol to generate a first encrypted data set. The method can include a communication interface of the data processing system transmitting, via the computer network, the first encrypted data set to one or more servers configured to process electronic transactions. The method can include the communication interface receiving, from the one or more servers, a second encrypted data set comprising second hash values generated by a second encryption module for the electronic transactions. Each of the second hash values can be generated by the second encryption module via application of a second hash function to a tuple formed of an identifier and a timestamp of each of the electronic transactions, the second encrypted data set encrypted by the second encryption module with a second encryption protocol. The first encryption protocol and the second encryption protocol can be commutative encryption protocols. The method can include the first encryption module using the first encryption protocol to encrypt the second encrypted data set received from the one or more servers to generate a first double encrypted data set. The method can include the communication interface receiving, from the one or more servers, a second double encrypted data set generated by the second encryption module via application of the second encryption protocol to the first encrypted data set transmitted by the data processing system to the one or more servers. The method can include a tuner executed by the one or more processors comparing the first double encrypted data set with the second double encrypted data set to determine a precision metric and a recall metric based on a total number of correct location determinations, a total number of location determinations, and a total number of actual location events. The method can include the tuner adjusting a tuning parameter of the location engine based on at least one of the precision metric or the recall metric.

At least one aspect is directed to a method of matching identifiers between multiple datasets. The method can include transmitting a first identifier vector to a third party server. The first identifier vector can include a first identifier, a plurality of first parameters, and a plurality of second parameters. The method can include receiving the first identifier vector encrypted based on a third-party encryption associated with the third party server. The method can include receiving, from the third party server, a second identifier vector encrypted based on the third-party encryption associated with the third party server. The second identifier vector can include a second identifier, a plurality of third parameters, and a plurality of fourth parameters. The method can include determining a correlation count between the first identifier vector and the second identifier vector based on a match between some of the plurality of first parameters and some of the plurality of the third parameters and between some of the plurality of the second parameters and some of the plurality of fourth parameters. The method can include determining that the first identifier corresponds to the second identifier based on the correlation count between the first identifier vector and the second identifier vector being above a determined threshold. The method can include generating, responsive to determining that the first identifier corresponds to the second identifier, one identifier key for both the first identifier and the second identifier At least one aspect is directed to system for matching identifiers between multiple datasets. The system can include a data processing system, comprising a mapping module. The data processing system can transmit a first identifier vector to a third party server. The first identifier vector can include a first identifier, a plurality of first parameters, and a plurality of second parameters. The data processing system can receive from the third party server, the first identifier vector encrypted based on a third-party encryption associated with the third party server. The data processing system can receive a second identifier vector, encrypted based on the third-party encryption associated with the third party server. The second identifier vector can include a second identifier, a plurality of third parameters, and a plurality of fourth parameters. The data processing system can determine a correlation count between the first identifier vector and the second identifier vector based on a match between some of the plurality of first parameters and some of the plurality of the third parameters and between some of the plurality of the second parameters and some of the plurality of fourth parameters. The data processing system can determine that the first identifier corresponds to the second identifier based on the correlation count between the first identifier vector and the second identifier vector being above a determined threshold. The data processing system can generate, responsive to determining that the first identifier corresponds to the second identifier, one identifier key for both the first identifier and the second identifier.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims

Like reference numbers and designations in the various drawings indicate like elements.

DETAILED DESCRIPTION

Figure 1:
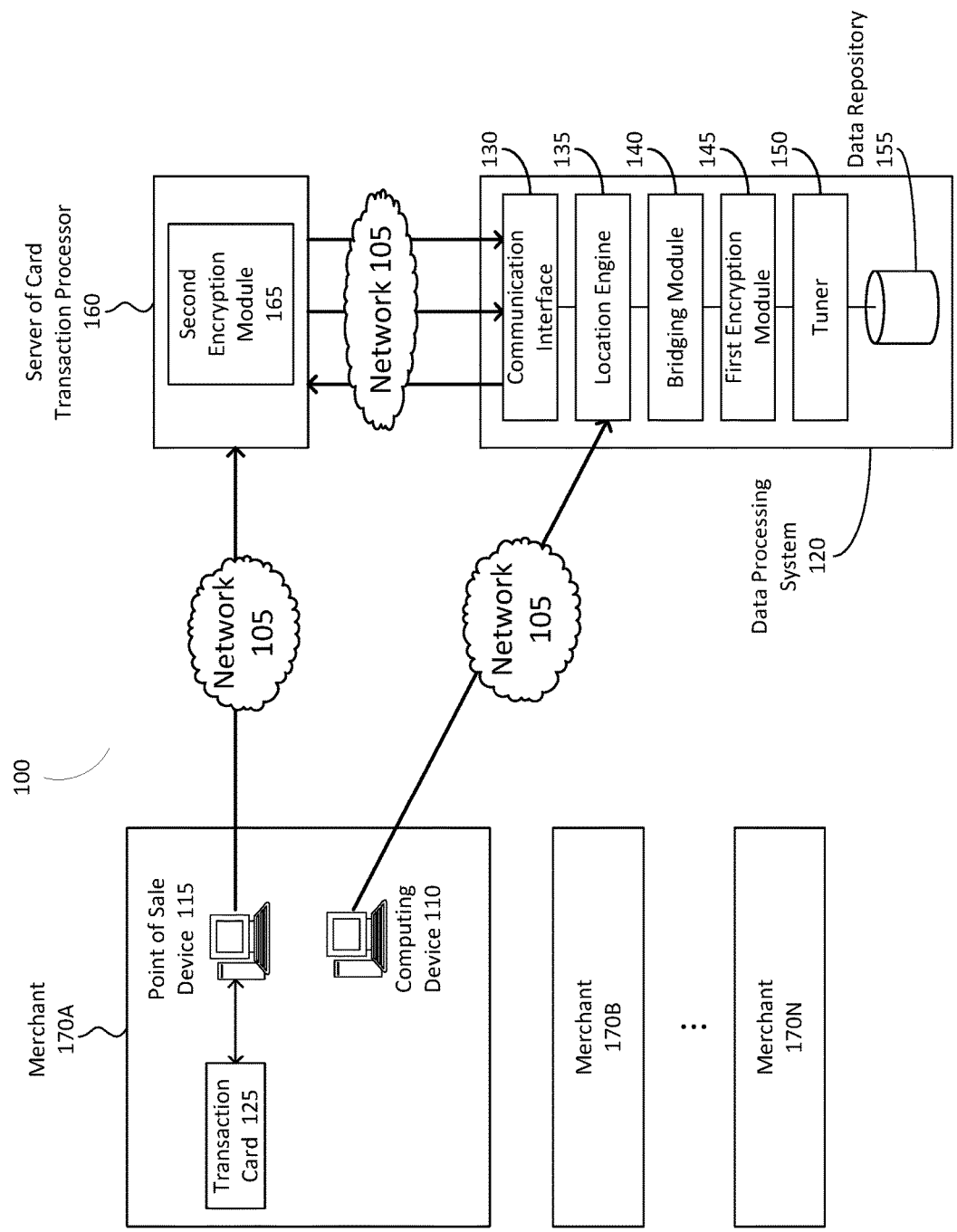
FIG. 1 is an illustration of a functional block diagram of a system to cryptographically protect location data to tune a location engine via a network in accordance with an implementation.

Systems and methods of the present disclosure relate to cryptographically protecting location data transmitted between entities or server via a network and evaluating the location data to tune a location engine using one or more parameters. For example, a data processing system of the present disclosure can evaluate the performance of a location engine using information from a third party entity that has been encrypted in a manner that conceals the encryption protocol used by the third party. The data processing system can automatically tune the location engine based on the evaluation to improve the accuracy of location determinations made by the location engine.

Location techniques such as GPS, cell phone triangulation, WIFI triangulation, may have limited resolution. For example, it may be challenging to precisely identify whether a mobile device is within a specific store in a densely populated area using certain location techniques. In addition, it may be challenging to cross-reference data collected or determined by various location engines, servers, computing devices or entities because each entity encrypts or conceals their data using their own encryption protocol. Thus, it may be technically challenging for a location engine to accurately determine a location, as well as compare the location determination with other sources to verify the location determination. The present technical solution solves this technical challenge by determining a recall metric and a precision metric that can be used to tune a location engine in a manner that cryptographically protects data of the entities without decrypting at least some of the data.

To determine a performance of the location engine, the data processing system can receive or access ground truth data associated with a location determination to determine a recall metric and a precision metric. Ground truth data indicates an actual location event in the physical world. For example, a third party service provider such as a credit card transaction processor can receive electronic requests via a network to process card transactions from point of sale devices located at physical stores of merchants. The card transaction initiated by the point of sale device at the merchant can indicate a ground truth location event because data packets associated with the electronic transaction identify the merchant identifier or location. The card transaction processor can store the ground truth location events and provide the ground truth data set to the data processing system.

The recall metric can be defined as the number of location determinations made by the location engine of the data processing system that are correct, divided by the number of total location records based on the truth data received from a third party, such as a card transaction processor. The precision metric can be defined as the number of location determinations made by the location engine of the data processing system that are correct, divided by the total number of location determinations made by the location engine of the data processing system.

To cryptographically protect the card transaction data of the card transaction processor as well as the location determinations made by the location engine, the data processing system can use a double encryption technique to maintain anonymity of the users and conceal the encryption techniques used to encrypt the data. For example, the data processing system can use the following technique to determine the recall metric and the precision metric:

- a data processing system can receive a plurality of location determinations made by a location engine of the data processing system, where each location determination is associated with a respective first identifier;
- the data processing system can receive location transaction records from a third party entity such as a card transaction processor, where each location transaction record is associated with a respective second identifier;
- the data processing system can map, bridge, or match the first respective identifier to the second respective identifiers using a predetermined mapping, bridging, or matching function;
- to prepare the data for exchange, the data processing system can determine a hash value for each record using a first hash function applied to a two tuple formed of the second identifier and the timestamp of each record;
- the third party entity can similarly prepare the data for exchange by determining a second hash value for each record by applying a second hash function to a two tuple formed of the second identifier and the timestamp;
- the data processing system can apply a first encryption to the first hash values; and the third party entity can apply a second encryption to the second hash values; where the first and second encryption functions are different but are both commutative;
- the data processing system can receive the second hash values encrypted with the second encryption function from the third party entity, and then apply the first encryption function, creating a first double encrypted data set;
- the third party entity can receive the first hash values encrypted with the first encryption function, and then apply the second encryption function, creating a second double encrypted data set;
- the data processing system can receive the second double encrypted data set and compares it with the first double encrypted data set to identify: 1) a total number of correct location determinations; 2) a total number of location determines made; and 3) a total number of actual location events;
- the data processing system can uses 1-3 above to generate a precision metric and a recall metric; and
- the data processing system can 1) adjust a tuning parameter of the location engine based on the recall and precision metrics to improve the performance of the location engine; or 2) use the recall and precision metric to facilitate real-time content selection.

FIG. 1 illustrates a functional block diagram of a system to cryptographically protect location data to tune a location engine via a network in accordance with an implementation. The environment 100 includes one or more merchants such as merchants 170A-N. A merchant can refer to a retail location, brick and mortar store location, restaurant, agency, pharmacy, place of business, service provider, laundromat, retail location in a mall or plaza, an electronic kiosk, or vending machine. The merchants 170A-N can be geographically disperse or densely populated. For example, in a city environment or mall, merchants 170A-N can be close to one another or adjacent to one another.

Merchant 170A can conduct electronic transactions using a point of sale device 115 that interacts with a transaction card 125. The point of sale device 115 can initiate an electronic transaction responsive to receiving input via a user interface, including at an entity such as a merchant, pharmacy, retail store, medical supply store, or other entity that provides goods or services. The transaction can occur via the point-of-sale terminal or device 115. The point of sale device 115 can include a checkout device, electronic point of sale device or other device that includes hardware and software to facilitate a transaction. The point of sale device 115 can be configured to receive financial transaction information via a transaction card 125 via a user interface. The transaction card 125 can refer to and include a plastic credit card or an electronic wireless payment method. For example, the user can be configured to receive information corresponding to a financial account identified via a transaction card 125 such as a debit card, pin number, mobile payment device, near field communication-enabled device, Bluetooth, smartphone, smartwatch, wearable communication devices, RFID, or other mobile telecommunications device) and communicate with one or more servers 160 or databases to authenticate the financial transaction information, identify a corresponding electronic account of the customer, and initiate or facilitate the transfer of funds from the customer account to merchant 170A. The transaction can be associated with information such as an account identifier, time stamp, merchant identifier, merchant location, or transaction amount. This information can be provided in real-time to a transaction repository maintained and managed by the server of the card transaction processor 160.

The card transaction processor 160 or card transaction server, 160 can receive, via network 105, data packets generated by the point of sale device 115 responsive to conducting an electronic transaction. The data packets can include header information and payload information. Multiple data packets can be strung together in a sequence. The header information can refer to TCP/IP headers that include fields such as source port, destination port, sequence number, acknowledgment number, or window size. The payload information of the data packet can include information related to the transaction, merchant, or customer. The server 160 can receive the data packet with header information and payload information and process the packets to obtain information for further processing. The payload can include data identifying a merchant, an electronic account, a timestamp, a merchant location, or a monetary amount of the electronic transaction. The server 160 can bucketize or quantize the location information or timestamp. The server 160 can map an account identifier of the electronic transaction to a second identifier that anonymizes the account identifier. The server 160 can include a second encryption module 165 that generates hash values with one or more of the account identifier, second identifier timestamp, or location information, and encrypts the hash values using an encryption protocol. The server 160 can store the encrypted transaction data in a data repository of the server 160.

A computing device 110, such as a mobile device, can interact, via network 105, with a data processing system 120. The data processing system 120 can ping the computing device 110 or the computing device 110 can initiate communication with the data processing system 120. The data processing system 120 can include a location engine 135 that determines or identifies a location of the computing device 110 based on the interaction. For example, the computing device 110 may provide location information to the data processing system 120 (e.g., address, geographic coordinates, map tile identifier), or the data processing system 120 can determine the location based on received information (e.g., cell phone tower triangulation, IP address, or WIFI triangulation). The data processing system 120 can determine a timestamp or computing device identifier associated with the computing device 110. The data processing system 120 can bucketize or quantize the timestamp or location information. The data processing system 120 can map the computing device identifier to the second identifier that anonymizes the computing device identifier. The data processing system 120 (e.g., via first encryption module 145) can generate hash values using one or more of the location determination, timestamp, or second identifier, and encrypt the hash values using an encryption protocol. The data processing system 120 can store the encrypted location determination and corresponding information in a data repository 155.

A communication interface of the data processing system 120 can transmit a first encrypted data set that includes the encrypted location determinations determined by the location engine 135 of the data processing system 120. The data processing system 120 can or may not provide an identification of an encryption protocol, or parameter thereof, used to encrypt the data.

The communications interface 10 of the data processing system 120 receives, via network 105, the encrypted data set from the server 160. The communication interface 130 receives a double encrypted data set from the server 160. For example, the second encryption module 165 can encrypt the data set received from the data processing system 120. The encryption protocols used by the second encryption module 165 and the first encryption module 145 can be the same or different. The encryption protocols can have a commutative property and be commutative encryption protocols. An encryption can have a commutative property if changing the order of encryptions does not change the result. For example, a first encryption protocol can be A( ) can be used to encrypt hash values from hash function h(location_data) as follows: A(h(location_data)). A second encryption protocol B( ) can be used to encrypt the hash values as follows: B(h(location_data)). The first A( ) and second B( ) encryption protocols may be different, but they may have commutative properties if double encrypted data sets are equal as follows: A(B(h(location_data)))=B(A(h(location_data))). Commutative encryption protocols or cryptography systems can include encryption protocols based on number theory, which may depend on commutative algebraic structures. For example, a commutative encryption protocol can include public-key cryptosystems such as the RSA cryptosystem (e.g., where the encryption key is public and differs from the decryption key which is concealed or kept secret; due to this asymmetry, it is technically challenging to decrypt without the decryption key because of the difficulty in factoring the product of two large prime numbers), or elliptic curve cryptography (e.g., public-key cryptography based on the algebraic structure of elliptic curves over finite fields).

The data processing system 120 can receive, from the card transaction server 160, the double encrypted data set generated by the second encryption module 165. Upon receiving the double encrypted data set, the data processing system 120 can compare the received double encrypted data set with the double encrypted data set created by the first encryption module 145 of the data processing system 120. Two encryption processes are applied to each of the data set to create the double encrypted data sets; the difference may be in the order in which the encryptions are applied to the data set. In some cases, the two encryptions protocols may be the same encryption protocol, different encryption protocols, or the same encryption scheme or technique with different parameters.

The data processing system 120 (e.g., via tuner 150) can compare the two double encrypted data sets to identify the number of matching entries or records among the data sets. The number of matching entries or records can indicate a number of location determinations made by the location engine 135 of the data processing system 120 that are correct. The number of total entries in the transaction data set generated by the server 160 can indicate the number of actual or visits or ground truth data because it is based on transactions that occurred at the merchant location. The data processing system 120 (e.g., via tuner 150) can determine the recall metric as the number of location determinations made by the location engine of the data processing system that are correct, divided by the number of total location records based on the truth data received from a third party, such as a card transaction processor. The data processing system 120 (e.g., via tuner 150) can determine the precision metric as the number of location determinations made by the location engine of the data processing system that are correct, divided by the total number of location determinations made by the location engine 135 of the data processing system 120.

Figure 2:
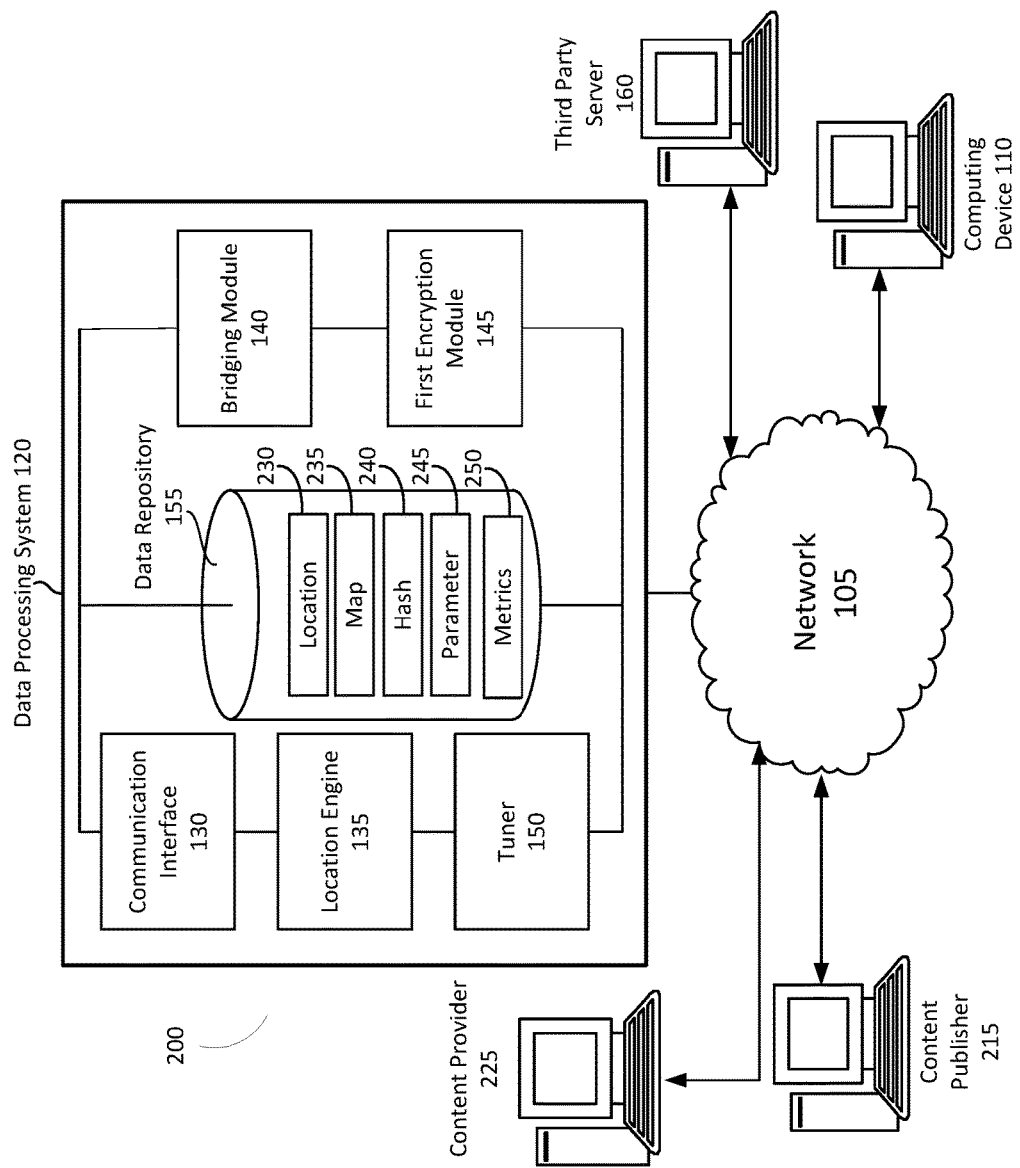
FIG. 2 is an illustration of a system to cryptographically protect location data to tune a location engine via a network in accordance with an implementation.

FIG. 2 illustrates a system to cryptographically protect location_data to tune a location engine via a network in accordance with an implementation. The system 200 can include content selection infrastructure. The system 200 can include a data processing system 120 communicating with one or more of a content provider 225, content publisher 215 or computing device 110 via a network 105. The network 105 can include computer networks such as the Internet, local, wide, metro, or other area networks, intranets, satellite networks, and other communication networks such as voice or data mobile telephone networks. The network 105 can be used to access information resources such as web pages, web sites, domain names, or uniform resource locators that can be displayed on at least one computing device 110, such as a laptop, desktop, tablet, personal digital assistant, smart phone, or portable computers. For example, via the network 105 a user of the computing device 110 can access web pages provided by at least one web site operator or content publisher 215. In this example, a web browser of the computing device 110 can access a web server of the web site operator or content publisher 215 to retrieve a web page for display on a monitor of the computing device 110. The web site operator or content publisher 215 generally includes an entity that operates the web page. In one implementation, the web site operator or content publisher 215 includes at least one web page server that communicates with the network 105 to make the web page available to the computing device 110.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The system 200 can include at least one data processing system 120. The data processing system 120 can include at least one logic device such as a computing device having a processor to communicate via the network 105, for example with the computing device 110, the web site operator or content publisher computing device 215 (or content publisher 215), and at least one content provider computing device 225 (or provider device 225 or content provider 225). The data processing system 120 can include at least one server. For example, the data processing system 120 can include a plurality of servers located in at least one data center. The data processing system 120 can include multiple, logically-grouped servers and facilitate distributed computing techniques. The logical group of servers may be referred to as a server farm or a machine farm. The servers can also be geographically dispersed. A machine farm may be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralizing the servers and storage systems and coupling them with advanced system management tools allows more efficient use of server resources.

The data processing system 120 can include a content placement system having at least one server. The data processing system 120 can include one or more of at least one communication interface 130, at least one location engine 135, at least one bridging module 140, at least one first encryption module 145, at least one tuner 150, or at least one data repository 155. The communication interface 130, location engine 135, bridging module 140, first encryption module 145 and tuner 150 can each include at least one processing unit or other logic device such as programmable logic array engine, or module configured to communicate with the database repository or database 155. The communication interface 130, location engine 135, bridging module 140, first encryption module 145 and tuner 150 can be separate components, a single component, or part of the data processing system 120. The system 200 and its components, such as a data processing system, may include hardware elements, such as one or more processors, logic devices, or circuits. The data repository 155 can store one or more data structures or databases in memory or other storage device, such as a location_data structure or database 230, map data structure or database 235, hash data structure or database 240, parameter data structure or database 245 and metrics data structure or database 250. In some implementations, the data processing system 120 can access a third party server 160, such as a server of a card transaction processor that includes a second encryption module 165. The third party server 160 can process electronic transactions conducted via one or more point of sale devices at a merchant.

The data processing system 120 can obtain anonymous computer network activity information associated with a plurality of computing devices 110. A user of a computing device 110 can affirmatively authorize the data processing system 120 to obtain network activity information corresponding to the user's computing device 110. For example, the data processing system 120 can prompt the user of the computing device 110 for consent to obtain one or more types of network activity information. The identity of the user of the computing device 110 can remain anonymous and the computing device 110 may be associated with a unique identifier (e.g., a unique identifier for the user or the computing device provided by the data processing system or a user of the computing device). The data processing system can associate each observation with a corresponding unique identifier.

For situations in which the systems discussed here collect personal information about users, or may make use of personal information, the users may be provided with an opportunity to control whether programs or features that may collect personal information (e.g., information about a user's social network, social actions or activities, a user's preferences, or a user's current location), or to control whether or how to receive content from the content server that may be more relevant to the user. In addition, certain data may be treated in one or more ways before it is stored or used, so that certain information about the user is removed when generating parameters (e.g., demographic parameters). For example, a user's identity may be treated so that no identifying information can be determined for the user, or a user's geographic location may be generalized where location information is obtained (such as to a city, ZIP code, or state level), so that a particular location of a user cannot be determined. Thus, the user may have control over how information is collected about the user and used by a content server.

In some implementations, the data processing system 120 can include a content selector. The content selector can analyze, parse, or otherwise process subject matter of candidate content items to determine whether the subject matter of the candidate content items correspond to a web page. The content selector can identify, analyze, or recognize terms, characters, text, symbols, or images of the candidate content items using an image processing technique, character recognition technique, or database lookup. The candidate content items may include metadata indicative of the subject matter of the candidate content items, in which case the content selector can process the metadata to determine whether the subject matter of the candidate content item corresponds to the web page or search query.

Content providers 225 can provide additional indicators when setting up a content campaign that includes content items. The content provider 225 may provide information at the content campaign or content group level that the content selector may identify by performing a lookup using information about the candidate content item. For example, the candidate content item may include a unique identifier, which may map to a content group, content campaign, or content provider. The content selector can determine, based on information stored in data repository 155 about the content provider.

The data processing system 120 can select the content using various techniques. For example, the data processing system 120 can select content from a referral or a lead from a partner content selection network. In some implementations, the content may not be selected using a keyword or matching technique, but be selecting based on a referral or a lead.

For example, the data processing system 120 can receive a request for content. The request may include keywords or a query such as a search query input into a search engine of the data processing system. The input query may include text, characters, or symbols, for example. The data processing system 120 can receive the input query from a computing device 110 via network 105. The input query may include audio such as words spoken by a user of the computing device 110 and input into the search engine of the data processing system via network 105 and an interface. The request may include or be associated with information that facilitates selecting content responsive to the request. The information may include, e.g., contextual information about an electronic document, web page, electronic application, or organic, non-advertisement link on which the selected content is to be displayed. The data processing system 120 can provide an interface displaying input text boxes, buttons, drop downs, or otherwise widgets through which a user of a client can select or otherwise indicate a category for the search.

Responsive to the search query or other request for content (e.g., electronic advertisements), the data processing system 120 (e.g., via a content selector) can identify, select or otherwise obtain content to be provided or presented via the computing device 110 making the request, or some other computing device 110 associated with the request for content. In some implementations, the data processing system 120 can identify, select, or otherwise obtain content not responsive to receiving any request. The content may include, e.g., text, characters, symbols, images, video, audio, or multimedia content. The content may include a phone number, a virtual phone number, or a call extension. The content item may include an advertisement in the form of a sponsored link provided by content providers and included by data processing system (e.g., via content selector) for display with the search results page. The content item may include a link or button to a phone number that facilitates providing reporting data to a content provider. In cases where the content item includes a virtual phone number or a call extension, the content item may be referred to as a call content item. The request for content can include a request for an online advertisement, article, promotion, coupon, or product description. The data processing system 120 can receive the request from a computing device such as, e.g., computing device 110. For example, the data processing system 120 can receive the request via an application executing on the computing device 110, such as a mobile application executing on a mobile device (e.g., smart phone or tablet). In some cases, the data processing system 120 may not receive a separate request for content and, instead, select and provide the content (e.g., advertisement) responsive to the search query or with search results. In some instances, a web page may request content from the data processing system 120 responsive to a user of a mobile device 110 visiting the web page (e.g., via a mobile device 110).

The request for content can include information that facilitates content selection. For example, the data processing system 120 can request information from the computing device 110 to facilitate identifying content or content selection. The data processing system 120 can request or obtain information responsive to receiving a request for content from the computing device 110. The information may include information about displaying the content on the computing device 110 (e.g., a content slot size or position) or available resources of computing device 110 to display or otherwise manipulate the content.

The data processing system 120 can identify multiple content items (e.g., a first candidate content item and a second candidate content item) that are responsive to the request for content, or are otherwise candidates for display on an online document (e.g., a web page). The data processing system can initiate or utilize an online auction process to select one or more of the multiple content items for display on the online document. An auction system may determine two or more bids for content items to be displayed in an online document. The auction system can run the bids through an auction process to determine one or more highest ranking bids or winning bids. Content items corresponding to the highest ranking or winning bids may be selected for display on or with the online document.

The data processing system 120 can include a location engine 135 designed and constructed to receive, identify, or determine a location of a computing device 110. The location engine 135 can receive geo-location data points associated with a computing device 110 and be configured with one or more parameters or tuning parameters that can be used to determine a location of the computing device 110. The data processing system 120 can receive the data points via a computer network 105 via a TCP/IP protocol, cell phone data network, or another communication protocol of computer network 105. The data points can include location information and time information, or the data processing system 120 can determine the location or time information associated with a received data point upon receiving the data point from the computing device 110. The data processing system 120 can also receive a first identifier associated with the data point, such as a unique computing device identifier, or a username associated with an application executing on the computing device 110. The application executing on the computing device 110 (e.g., a mobile application, a mobile operating system, a web browser, or a map application) can transmit the geo-location data point that includes the location information. A mobile computing device 110 may periodically ping the data processing system 120 or other intermediate system to provide location or time information. In some cases, a smartphone or other cellular enabled computing device 110 can ping a cell phone tower system, which may then provide location or time information to the data processing system 120.

The data processing system 120 can receive geo-location data points or pings in real time, or a predetermined time interval such as a periodic basis (e.g., 10 minutes, 5 minutes, 1 minute, 30 seconds, or another period that can facilitate the systems and methods disclosed herein). A tuning parameter of the location engine 135 can include the predetermined time interval. The data processing system 120 can receive the data points in a batch process that runs periodically where multiple geo-location data points associated with a computing device 110 or multiple computing devices 110 can be provided to the data processing system 120 in a single upload process. In some cases, the computing device 110 can push the data points to the data processing system 120 in real-time, periodic basis, or in a batch process.

The data points may include, or the data processing system 120 may determine, geographic location information of the geo-location data point based on, e.g., GPS, Wi-Fi, IP address, Bluetooth, beacon technology, radio frequency identification (RFID), near field communication technology, or cell tower triangulation techniques. In some implementations, the data processing system 120 can determine a latitude and longitude coordinate and identify a larger geographic area or cell comprising the latitude and longitude coordinate. The geographic location may correspond to a latitude or longitude coordinate, or the geographic location may correspond to a larger or smaller area, for example.

In some implementations, the received data points may include, or the data processing 120 may determine, geographic location information including, e.g., latitude and longitude coordinates, geographic information system ("GIS") information, country, state, city, county, town, or precinct. The data processing system 120 may receive or otherwise identify geographic location information associated with the computing device 110 via an application programming interface ("API") that can provide scripted access to geographic location information associated with the computing device 110. For example, the geographic API specification may include a specification associated with the World Wide Web Consortium ("W3C"). In one implementation, a user of a computing device 110 proactively declares a location by checking-in to a location or otherwise declaring to an application executing on the computing device 110 or to the data processing system that the user is at a location.

In some implementations, the geographic location of the computing device 110 can be determined via at least one of a global positioning system ("GPS"), cell tower triangulation, or Wi-Fi hotspots. In some implementation, the data processing system 120 can identify or determine the technique used to determine a geographic location in order to determine an accuracy of the determined geo-location data point (e.g., GPS-based location information may be more accurate than IP-based location information). The data processing system 120 can also determine geographic location information based on a user's interaction with an information resource. In some implementations, the computing device 110 may include a global positioning system ("GPS"). In some implementations the data processing system 120 may determine a geographic location based on an internet protocol ("IP") address. For example, the computing device 110 may include a GPS sensor or antenna and be configured to determine a GPS location of the computing device 110. The data processing system 120 can also determine the geographic location by using information obtained from one or more cell towers to triangulate the location of the computing device 110. For example, the geographic location determined based on one information received from one cell tower, two cell towers or three cell towers may be sufficient for content selection. In some implementations, Wi-Fi hotpots may facilitate determining a geographic location because Wi-Fi hotspots may be stationary and can be used as a landmark. For example, the relation of a computing device 110 with respect to a Wi-Fi hotspot can facilitate determining a geographic location of the computing device 110.

In some cases, the location engine 135 can cluster the location pings or location data points received from or associated with a computing device 110 to determine a location of the computing device 110. The location engine 135 can cluster the location pings or data points based on a time interval, distance threshold, or both the time interval and distance threshold.

For example, the location engine 135 can generate a location cluster that includes a first data point (or initial data point) and subsequent data points. A data point can include or indicate a latitude and longitude coordinate, time stamp, or computing device identifier. The first data point may refer to a centroid data point which the data processing system 120 can use to identify which of the subsequent data points satisfy a distance threshold in order to generate a location cluster. While referred to as subsequent data points, the subsequent data points may, but need not be, received by the data processing system 120 later in time relative to the first data point. The data processing system 120 can identify the first data point based on a time factor, location factor, or other logic. The data processing system 120 can identify the first data point as the earliest received data point within a radius (e.g., 10 miles, 20 miles, 50 miles). In another implementation, the data processing system 120 may identify the first data point based on identifying a plurality of data points that were received within a predetermined time interval (e.g., all data points received in the span of 5 minutes, 10 minutes, 15 minutes, 30 minutes, or 1 hour) and then identifying a centroid data point of the plurality of data points (e.g., by mapping the data points and identifying the data point closest to the center)

In one implementation, where the first data point is the first data point based on time, subsequent data points refer to data points that were received (or contain a timestamp) that is after the first data point. The subsequent data points can refer to one or more data points with time stamps immediately after the first data point. Upon identifying a first data point, the data processing system 120 can generate a cluster with the subsequent data points by determining whether each subsequent data point satisfies a distance threshold. The data processing system 120 can identify the first data point and then compare the location of the first data point with a location of the second data point. If the second data point is within the distance threshold of the first data point, the data processing system 120 generates a location cluster that includes the first data point and the second data point. The data processing system 120 can identify a third data point, that is subsequent to the second data point, and compare the third data point with the first data point. In this example, the data processing system 120 compares the distance of each subsequent data point with the first data point. If the distance between the first data point and the third data point satisfies the threshold distance, then the data processing system 120 can generate a cluster with, or add to the cluster being generated, the third data point. If the third data point does not satisfy the threshold distance (e.g., exceeds the threshold distance), then the data processing system 120 may not include the data point in the location cluster. In some cases, the data processing system 120 may identify the third point as a new initial or new first data point of a second location cluster, and proceed to process data points subsequent to the third data point in a manner similar to above.

The location engine 135 can be configured with one or more distance thresholds (e.g., first, second, third, fourth distance thresholds) that correspond to different distances (e.g., 10 meters, 20 meters, 30 meters, 50 meters, or other distance threshold that facilitates making a location determination of a computing device 110). Using the various distance thresholds, the system can generate a plurality of location clusters of different sizes. This may facilitate generating valid clusters in different environments, such as rural and urban environments, or in relation to different size commercial entities, such as department stores, stadiums, convention centers, or boutiques. The location engine 135 can be tuned using tuning parameters corresponding to distance thresholds. For example, a tuning parameter can be the distance threshold, and a tuner 150 can tune the location engine 135 by adjusting the distance threshold tuning parameter used by the location engine 135 to determine a location of the computing device.

The distance threshold can be static or dynamic. The threshold distance can be a static value (e.g., 50 meters, 100 meters, or 200 meters). In another implementation, the threshold distance can be fine-tuned by the tuner 150 based on metrics, feedback or optimization techniques. For example, the data processing system 120 may determine that cluster sizes are too large because they are not indicative of a user visiting a store, associated with an unsatisfactory recall metric or precision metric, and thus lower the threshold distance value. In another implementation, the data processing system 120 (e.g., via tuner 150) can determine that the threshold distance is too small in relation to the size of a commercial entity because too many clusters were generated for a commercial entity.

The data processing system 120 can vary the threshold distance based on the recall metric, precision metric, or the granularity of the location information available. For example, WiFi, cell triangulation and GPS provide location information with varying accuracy or resolution. The data point may include information as to the locating technique being used, or the data processing system 120 may determine the location technique being used based on the type of data included in the data point. If the location information is accurate to within 100 meters, then the threshold distance may be 100 meters. If the location information is accurate to within 50 meters, then the threshold distance may be 50 meters. In one implementation, the data processing system 120 (e.g., via tuner 150) can adjust a tuning parameter corresponding to a minimum or maximum number of data points for a cluster. The minimum and maximum values may be static or dynamic (e.g., predetermined numbers or numbers that vary based on optimization processes; numbers that vary based on geographic locations (e.g., urban areas versus rural areas)). In some cases, the data processing system 120 may not identify a cluster as a location cluster unless the location cluster includes a minimum number of data points (e.g., 3, 4, 5 or another value that facilitates generating valid clusters). The data processing system 120 can also set a maximum number of data points for a cluster before generating a second cluster. The maximum number may be set based on a static value (e.g., 3, 4, 5, 10, 20, or another value that facilitates generating valid clusters), or dynamic (e.g., based on the geographic location).

Thus, parameters or tuning parameters of the location engine can include, for example, a time interval for receiving location pings from a computing device, a time interval or frequency of location pings to use to determine a location of a computing device, a source of location information to use (e.g., GPS, WIFI, cell phone triangulation, or beacon), a combination of one or more sources to use, cluster distance threshold, cluster time threshold, number of minimum data points to form a cluster, or number of maximum data points to form a cluster.

The data processing system 120 can include a bridging module 140 designed and constructed to retrieve, from a location database stored in memory, a plurality of location determinations made by the location engine of the data processing system. Each location determination can be associated with a respective first identifier. The first identifier can correspond to an identifier used by the data processing system 120 or location engine 135 to identify the computing device 110. The first identifier may be concealed or unique to the data processing system 120. Different entities can use different identifiers or types of identifiers to identify a computing device 110 or transaction. For example, the data processing system 120 can use a first identifier to identify the computing device 110 and location of the computing device 110 at merchant 170A. However, a third party server 160 of a transaction processor 160 can use a third party identifier to identify the transaction associated with the transaction card 125. The user of the transaction card 125 may be the same user as the computing device 110. In some cases, the user of the transaction card 125 may be different from the computing device 110. The data processing system 120 can encrypt or otherwise conceal the first identifier. The card transaction processor 160 can encrypt or otherwise conceal the third party identifier. The data processing system 120 can store the location determinations with corresponding first identifiers in a first data set; and the card transaction processor 160 can store location determinations made from transactions with corresponding third party identifiers. The third party server can map the third party identifier to an anonymous second identifier. This anonymous second identifier can map to a permanent third party identifier used by the third party server 160 or card transaction processor.

The bridging module 140 can determine the mapping between a set of first identifiers known to the data processing system 120 and a set of second identifiers known to a third party entity 160 which both refer to or are associated with the same computing device 110 or users associated with the first identifier and the second identifier. The bridging module 140 can establish a direct bridge link between the data processing system 120 and the third party 160 using encrypted location and time information. By observing the computing device 110 at a same place and same time on multiple occasions across the two data, the data processing system 120 can create a mapping function from the first identifier to the second identifier.

The first identifier can refer to a first bridging identifier created by the bridging module 140. The first identifier can refer to an anonymous identifier that corresponds to an actual identifier of the computing device 110. The bridging module 140 can create the first identifier by encrypting an actual identifier (e.g., a user name, phone number, screen name, log-in identifier, or profile name) associated with the computing device 110.

The second identifier can refer to a second bridging identifier created by the third party server 160 or card transaction processor. The second identifier can refer to an anonymous identifier that corresponds to an actual identifier associated with the computing device 110 or a user of the computing device 110. The third party server 160 can create the second identifier by encrypting an actual identifier (e.g., an account identifier, user name, phone number, screen name, log-in identifier, or profile name) associated with the computing device 110. The first identifier and the second identifier may be different identifiers because the data processing system 120 and the third party server 160 may use different encryption techniques.

Therefore, the data processing system 120 may not have information about how the card transaction processor 160 identifies a computing device 110 or user associated with the card transaction. The data processing system 120, card transaction processor 160, or administrators thereof, may not wish to transmit proprietary or confidential information.

For example, the computing device 110 can access an online resource or document (e.g., a webpage, content item, or advertisement) provided via the data processing system 120. The data processing system 120 can assign a first identifier for the computing device 110. The data processing system 120 can assign a first identifier for the computing device 110 responsive to the computing device 110 access a resource or document via the data processing system 120. The data processing system 120 can encrypt or otherwise conceal an identifier of computing device to create the first identifier. The first identifier can be an encrypted identifier corresponding to an actual identifier of the computing device 110.

A user of the computing device 110 can conduct a card transaction at a point of sale device 115 at a merchant A. The card transaction processor 160 can determine a third party identifier associated with the transaction. The card transaction processor 160 can generate a second identifier that encrypts or otherwise conceals the third party identifier using an anonymous second identifier. The second identifier can be an encrypted identifier corresponding to an actual third party identifier associated with the card transaction or user.

The data processing system 120 can use a blind encryption technique to allow various parties to determine the correlation between their respective identifiers encrypted using encryption techniques (e.g., first identifiers and second identifiers). The data processing system 120 and a third party server 160 (e.g., a computing system with one or more processors) can encrypt received identifier vectors that contain log data of the computing device interactions, and exchange the encrypted identifier vectors. In some cases, prior to exchanging the data for a merchant location, the data processing system 120 can apply a per-store privacy threshold. For example, the data processing system 120 may compare the number of identifiers or entries in the data set with a threshold (e.g., 100, 500, or 1000) or the threshold over a time interval (e.g., 24 hours, 48 hours, 72 hours, 1 week, 30 days, or 60 days), and block the exchange if the number of entries is less than or equal to the threshold. A computing device interaction can include, for example, requests for online content from the server, visits to a websites, and computing device identifier authentication, or any other activity between the computing device and the server. Using the exchanged and encrypted identifier vectors, the bridging module 140 or the third party server 160 can determine which of the other identifiers correspond to their identifiers using a mapping function, and generate an identifier key for each of the respective identifiers.

For example, the data processing system 120 can transmit a first identifier vector to a third party server 160. The first identifier vector can include one or more first identifiers (e.g., actual identifiers or usernames encrypted using an encryption technique), a set of first parameters, and a set of second parameters. The one or more first identifiers can correspond to one or more computing devices 110. The first identifier vector can also include an encryption of the first identifier and a set of keys based on a combination of the respective first parameter and the respective second parameter. The first identifier can include or correspond to a device identifier associated with a particular computing device or an account identifier associated with a profile, address, or account, for example. The key can be based on the combination of the respective first parameter and the respective second parameter. The data processing system 120 can generate the key using a hash function applied to the first parameter and the second parameter. Each of the first parameters and second parameters can be a part of a log row entry specifying, for example, the location and time of the corresponding logged computing device interaction.

The data processing system 120 can transmit, via network 105, the first identifier vector to the third party server 160. The third party server 160 can encrypt the first identifier vector using an encryption algorithm. The third party server 160 can transmit the encrypted first identifier vector back to the data processing system 120. The data processing system 120 can receive the encrypted first identifier vector back from the third party server 160.

In addition, the data processing system 120 can receive a second identifier vector from the third party server based on the log data of the third party server 160. The second identifier vector can include one or more second identifiers, a set of third parameters, and a set of fourth parameters. The one or more second identifiers can correspond to encrypted third party identifiers that correspond to one or more transaction cards 125 or other identifiers associated with ground truth data collected or determined by the third party server 160. The second identifier vector can also include the second identifiers (e.g., an encryption of actual third party identifiers) and a set of keys based on a combination of the respective third parameter and the respective fourth parameter. The second identifiers used by the third party server 160 may be different from the first identifiers used by the data processing system 120. The encryption applied by the third party server 160 may be different from the encryption applied by the data processing system 120. The encryption applied by the third party server 160 may be the same or similar to the encryption applied by the data processing system 120. The third party server 160 or data processing system 120 may conceal the type of encryption being used. The third parameter can correspond to the same type of log information as the first parameter. The fourth parameter can correspond to the same type of log information as the third parameter. Each of the third parameters and fourth parameters can include a log row entry specifying, for example, the location and time of the corresponding logged computing device interaction. The location and time information can be bucketized or quantized based on a granularity or resolution. For example, the time can be rounded to the nearest 1 minute, 30 seconds, 10 seconds, 5 seconds, 1 second, or 1 millisecond. The location can mapped to a tile or geographic area (e.g., a rectangle, square, or square) having a dimension such as 50 meter radius, 100 meter radius, 10 meter radius, or 5 meter radius.

The data processing system 120 can apply an encryption algorithm to the second identifier vector received from the third party server 160. The data processing system 120 can determine a correlation or mapping between the first identifier vector and the second identifier vector based on the matches between the first parameters and the third parameters and between the second parameters and the fourth parameters. For example, the first parameter and third parameter include location information about a user interaction and the second parameter and the fourth parameter include time information about the user interaction. In this example, The data processing system 120 can determine that there is a match between the respective parameters, when they are within a defined threshold distance and time frame. The data processing system 120 can then determine that the first identifiers and second identifiers correspond to each other, when the number of such matches is above a defined threshold. Using this correspondence, the data processing system 120 can generate a bridge or match identifier key and store the key in the map data structure 235 in data repository 155.

Still referring to the bridging module 140, the data processing system 120 can transmit a first identifier vector to a third party server 160. The first identifier vector can include one or more first identifiers corresponding to one or more computing devices 110, a plurality of first parameters, and a plurality of second parameters. The first identifier, the plurality of first parameters, and the plurality of second parameters can be stored in and obtained from the one or more databases 155. The first identifier vector can be, for example, of the form of an indexed tuple, one or multiple dimensional array, container, linked list, tree, or any data structure suitable to store or otherwise index logged user interactions, such as the first identifier, plurality of first parameters, and plurality of second parameters. The first identifier can include, for example, an encrypted account identifier, encrypted device identifier, encrypted phone number, or a combination thereof, or any other encrypted identifier associated with computing device 110. The first identifier can be, for example, of the form of an alphanumerical string, a randomly or pseudo-randomly generated number, or a character string, among others. The plurality of first parameters and plurality of second parameters each can catalog or otherwise index log data of interactions by the one or more computing devices 110 with the data processing system 120, the content provider computing device 225, or the content publisher computing device 215, via the network 105. The log data of interactions by the one or more client devices 125 can be stored in and obtained from the one or more databases 155. The plurality of first parameters can include location identifiers of the associated recorded interaction. The plurality of second parameters can include time stamps of the associated recorded interaction. The plurality of first parameters and the plurality of second parameters can include other parameters or data used to catalog or record log data of interactions by the one or more client devices 125. Represented mathematically, the first identifier vector can be, for example, of the form:

$$X \triangleq [ID_X\{(p_1,q_1),(p_2,q_2), \ldots (p_N,q_N)\}]$$

where X is the first identifier vector, $ID_X$ is the first identifier, $p_n$ is the first parameter for the n-th recorded interaction, and $q_n$ is the second parameter for the n-th recorded interaction. For example, the first parameters can be location identifier of recorded interactions and second parameters can be time stamps of recorded interactions. Furthermore, the computing device 110 with the device identifier "x345q$" can have transmitted a request for a webpage on Jul. 14, 2015 at time 15:34:11 from San Jose, Calif. and then another request for another webpage on Jul. 15, 2015 at time 9:12:34 from Folsom, Calif., both requests recorded by the data processing system 120 at the one or more databases 155. In this example, $ID_A$ would be "x345q$", $P_t$ would be "San Jose, Calif.," $q_1$ would be "Jul. 14, 2015 15:34:11," $p_2$ would be "Folsom, Calif.," and $q_2$ would be "Jul. 15, 2015 9:12:34."

The bridging module 140 can categorize the plurality of first parameters and the plurality of second parameters into a plurality of first categories based on the respective value of the plurality of first parameters or the respective value of the plurality of second parameters. The bridging module 140 can categorize the plurality of first parameters and the plurality of second parameters into a plurality of first categories based on a first quantization of the plurality of first parameters. The bridging module 140 can categorize the plurality of first parameters and the plurality of second parameters into a plurality of second categories based on a second quantization of the plurality of second parameters. The first quantization can define or otherwise specify which of the plurality of first parameters are categorized into the respective first category. The second quantization can define or otherwise specify which of the plurality of second parameters are categorized into the respective second category. The first quantization and the second quantization can be used to assign, categorize, or classify a first parameter and the second parameter respectively to a more genericized category. The bridging module 140 can generate a plurality of first category values and a plurality of second category values. Each of the plurality of first categories and each of the plurality of second categories can be associated with a category value or index, such as, for example, a randomly generated alphanumeric value. From the previous example, if the first quantization is by city and the second quantization is by date, the bridging module 140 can categorize the request for the webpage on Jul. 14, 2015 at time 15:34:11 from San Jose, Calif. in a category different from the request for the other webpage on Jul. 15, 2015 at time 9:12:34 from Folsom, Calif. based on the quantizations for the respective category. In addition, each of these categories can then be assigned a different random alphanumeric value. Represented mathematically, the first identifier vector can be, for example, of the form:

$$X \triangleq [ID_X\{\langle(p_1,q_1),(p_2,q_2) \ldots \langle_i, \ldots \rangle(p_N,q_N)\rangle_I\}]$$

where X is the first identifier vector, $ID_X$ is the first identifier, $p_n$ is the first parameter for the n-th recorded interaction, $q_n$ is the second parameter for the n-th recorded interaction, and $\langle \ldots \langle_i$ denotes the i-th respective category value into which the first parameter $p_n$ and the second parameter $q_n$ were categorized based on the first parameter value or the second parameter value, or a combination thereof. The data processing system 120 can transmit a first identifier vector that includes a first identifier and a plurality of first category values or the plurality of second category values to the third party server 160. The data processing system 120 can transmit a first identifier vector that includes a first identifier and a plurality of first categories or the plurality of second categories to the third party server 160.

The bridging module 140 can generate a plurality of first combinations of the plurality of first parameters and the plurality of second parameters. Each of the plurality of first combinations can be generated, for example, based on a hash function or cipher function of each of the plurality of first parameters and each of the plurality of second parameters. Represented mathematically, using a hash function of a location identifier as the first parameter and a time stamp as the second parameter, the first identifier vector can be, for example, of the form:

$$X \triangleq [ID_X\{\langle h(l_1,t_1),h(l_2,t_2) \ldots \langle_i, \ldots \rangle h(l_N,t_N)\rangle_I\}]$$

where X is the first identifier vector, $ID_X$ is the first identifier, $l_n$ is the location identifier for the n-th recorded interaction, $t_n$ is the time stamp for the n-th recorded interaction, $\langle \ldots \rangle_t$ denotes the i-th respective category value into which the location identifier $l_n$ and the time stamp $t_n$ were categorized based on the location identifier or the time stamp, and h(•) is the hash function. The data processing system 120 can transmit the first identifier vector including the first identifier and the plurality of first combinations to the third party server 160.

The bridging module 140 can encrypt the first identifier, the plurality of first parameters, and the plurality of second parameters based on a first encryption. The bridging module 140 can encrypt the first identifier, the plurality of first parameters and the plurality of first combinations. In some cases, the bridging module 140 can call the first encryption module 145 to encrypt the first identifier, the plurality of first parameters, and the plurality of second parameters based on a first encryption. The bridging module 140 can provide or transmit the first identifier, the plurality of first parameters, and the plurality of second parameters to the first encryption module 145 for encryption. In some cases, the bridging module 140 can launch or otherwise cause the first encryption module 145 to encrypt the first identifier, the plurality of first parameters, and the plurality of second parameters based on a first encryption.

The data processing system 120 can include a first encryption module 140 designed and constructed to encrypt data using a first encryption or one or more encryption algorithms. For example, the first encryption can include asymmetric encryption algorithms, cryptographic hash functions, fingerprints, or any other encryption algorithm that may be commutative. The first encryption module 145 can use an RSA cryptosystem technique, in which the encryption key may be known to every computing device and may be different from the decryption key which may be kept secret. In this example, the asymmetry may be based on the difficulty of factoring the product of two large prime numbers. Represented mathematically, using a hash function of a location identifier as the first parameter and a time stamp as the second parameter, the first identifier vector encrypted based on the first encryption can be, for example, of the form:

$$\overline{X} \triangleq AX = A[ID_X\{\langle h(p_1,q_1), h(p_2,q_2) \ldots \langle_i \ldots \rangle (h(p_N,q_N)\rangle_I\}]$$

where $\overline{X}$ is the encrypted first identifier vector, X is the first identifier vector, A is the first encryption matrix, $ID_X$ is the first identifier, $l_n$ is the location identifier for the n-th recorded interaction, $t_n$ is the time stamp for the n-th recorded interaction, $\langle \ldots \rangle_i$ denotes the i-th respective category value into which the location identifier $l_n$ and the time stamp $t_n$ were categorized, and h(•) is the hash function. In this example, using the first encryption matrix A, the first encryption module 145 can apply a same or different encryption algorithm for each or some of the first identifier and the respective category value of the plurality of first categories and the respective category value of the plurality of second categories. The data processing system 120 can transmit the first identifier vector encrypted based on the first encryption to the third party server 160, subsequent or responsive to encrypting the first identifier, the plurality of first parameters, and the plurality of second parameters based on the first encryption.

The data processing system 120 can receive, from the third party server 160, the first identifier vector encrypted based on a third party encryption associated with the third party server 160. The third party server 160 may have encrypted the first identifier vector responsive to receiving the first identifier vector from the data processing system 120. For example, receipt of the first identifier vector by the third party server 160 can cause or otherwise trigger the third party server 160 or one or more entities or devices associated with the third party server 160 to encrypt the received first identifier vector based on the third party encryption. Subsequent to or simultaneous with transmitting the first identifier vector to the third party server 160, the data processing system 120 can also transmit to the third party server 160 a request to encrypt the first identifier vector. The request to encrypt the first identifier vector can also cause or otherwise trigger the third party server 160 or one or more entities associated with the third party server 160 to encrypt the first identifier vector based on the third party encryption. Examples of the third party encryption can include asymmetric encryption algorithms, cryptographic hash functions, fingerprints, or any other encryption algorithm that may be commutative. Represented mathematically, using a hash function of a location identifier as the first parameter and a time stamp as the second parameter, the first identifier vector further encrypted based on the third party encryption can be, for example, of the form:

$$\overline{\overline{X}} \triangleq B\overline{X} = BAX = BA[ID_X\{\langle (h(l_1,t_1), h(l_2,t_2)\langle_i \ldots \rangle h(l_N,t_N)\rangle_I\}]$$

where $\overline{\overline{X}}$ is the first identifier vector doubly encrypted by the first encryption and the third party encryption, $\overline{X}$ is the first identifier vector encrypted by the first encryption, X is the first identifier vector, B is the third party encryption matrix, A is the first encryption matrix, $ID_X$ is the first identifier, $l_n$ is the location identifier for the n-th recorded interaction, $t_n$ is the time stamp for the n-th recorded interaction, $\langle \ldots \rangle_i$ denotes the i-th respective category value into which the location identifier $l_n$ and the time stamp $t_n$ were categorized based on the location identifier or the time stamp, and h(•) is the hash function.

The data processing system 120 can receive from the third party server 160 a second identifier vector encrypted based on the third-party encryption associated with the third party server 160. The second identifier vector can include a second identifier, a plurality of third parameters, and a plurality of fourth parameters. The second identifier, the plurality of third parameters, and the plurality of fourth parameters can be stored in and obtained from the one or more databases at or associated with the third party server 160. The plurality of third parameters and the plurality of first parameters can be of a first type of parameter. The plurality of fourth parameters and the plurality of second parameters can be of a second type of parameter. For example, if the plurality of first parameters and the plurality of second parameters were location identifiers and time stamps, respectively, that each identify a location and time of the interaction recorded by the one or more databases 155, the plurality of third parameters and the plurality of fourth parameters can also be location identifiers and time stamps, respectively, of the interactions recorded by the third party server 160. The second identifier vector can be, for example, of the form of an indexed tuple, one or multiple dimensional array, container, linked list, tree, or any data structure suitable to store or otherwise index logged user interactions, such as the second identifier, plurality of third parameters, and plurality of fourth parameters. The second identifier can include, for example, an account identifier, a username, a card identifier, a device identifier, a phone number, or a combination thereof, or any other identifier to identify a particular user or computing device 110. In some cases, the second identifier can include, for example, an encrypted account identifier, an encrypted username, an encrypted card identifier, an encrypted device identifier, an encrypted phone number, or a combination thereof, or any other identifier to identify a particular user or computing device 110. The plurality of third parameters and plurality of fourth parameters each can catalog or otherwise index log data of interactions by the one or more computing devices 110 with the third party server 160, the content provider computing device 225, or the content publisher computing device 215 via the network 105. The log data of interactions by the one or more computing devices 110 can be stored in and obtained from the one or more databases at or associated with the third party server 160. The plurality of third parameters can include location identifiers of the associated recorded interaction. The plurality of fourth parameters can include time stamps of the associated interaction. The plurality of third parameters and the plurality of fourth parameters can include other parameters or data used to catalog or record log data of interactions by the one or more computing devices 110.

The data processing system 120 can transmit a request for the second identifier vector to the third party server 160. Receipt of the request for the second identifier vector to the third party server 160 can cause or otherwise trigger the third party server 160 to encrypt the second identifier vector and transmit the encrypted second identifier vector to the data processing system 120. Receipt of the first identifier vector by the third party server 160 can also cause or otherwise trigger the third party server 160 to encrypt the second identifier vector and transmit the encrypted second identifier vector to the data processing system 120. The data processing system 120 can also receive from the third party server 160 the second identifier vector encrypted based on the third party encryption associated with the third party server 160, prior to transmitting the request for the second identifier vector or the first identifier vector to the third party server 160. Examples of the third party encryption can include asymmetric encryption algorithms, cryptographic hash functions, fingerprints, or any other encryption algorithm that may be commutative. Represented mathematically, the second identifier vector encrypted based on the third party encryption can be, for example, of the form:

$$\overline{Y} \triangleq BY = B[ID_Y, \{(r_1,s_1),(r_2,s_2), \ldots (r_M,s_M)\}]$$

where $\overline{Y}$ is the encrypted second identifier vector, Y is the second identifier vector, B is the third party encryption matrix, $ID_Y$ is the second identifier, $r_m$ is the third parameter for the m-th recorded interaction, and $s_m$ is the fourth parameter for the m-th recorded interaction. Using the third party encryption matrix B, different encryption algorithms may be applied to each or some of the second identifier, the plurality of third parameters, and the plurality of fourth parameters are encrypted. For example, the third parameters can be location identifier of recorded interactions and fourth parameters can be time stamps of recorded interactions. Furthermore, the one or more computing devices 110 associated with the account identifier "cr3alq@example_mail.com" could have made a purchase from a physical store (e.g., merchant 170A) at Jul. 15, 2015 at time 8:50:02 located in San Jose, Calif. and then another purchase order on the user's computing device 110 from a webpage at Jul. 15, 2015 at 9:19:59 from Folsom, Calif., both purchase orders recorded at one or more databases at the third party server 160. In this example, the $ID_Y$ could be "cr3alq@example_mail.com," $r_1$ would be "San Jose, Calif.," $s_1$ would be "Jul. 15, 2015 8:50:02," $r_2$ would be "Folsom, Calif.," and $s_2$ "Jul. 15, 2015 9:19:59."

The data processing system 120 can receive from the third party server 160 the second identifier vector that includes the second identifier and a plurality of third category values or a plurality of fourth category values. The plurality of third category values or the plurality of fourth category values can be based on a plurality of third categories and the plurality of fourth categories. The plurality of third parameters and the plurality of fourth parameters can be assigned, categorized, or otherwise classified into the plurality of third categories based on the respective value of the plurality of third parameters or the respective value of the plurality of fourth parameters, or a combination thereof. The plurality of third parameters and the plurality of fourth parameters can be assigned, categorized, or otherwise classified into a plurality of third categories based on a third quantization of plurality of third parameters. The plurality of third parameters and the plurality of fourth parameters can be assigned, categorized, or otherwise classified into a plurality of fourth categories based on a fourth quantization of plurality of fourth parameters. The third quantization can define or otherwise specify which of the plurality of third parameters are categorized into the respective third category. The fourth quantization can define or otherwise specify which of the plurality of fourth parameters are categorized into the respective fourth category. Each of the plurality of third categories and each of the plurality of fourth categories can be associated with a category value or index, such as, for example, a randomly generated alphanumeric value. Using the previous example, if the fourth quantization specified that all purchase orders made on July 15 before 12:00:00 were to be categorized into a single category, the purchase order made on Jul. 15, 2015 at 8:50:02 and the purchase order made on Jul. 15, 2015 at 9:19:59 can be categorized into the same category and be associated with the same category index. Represented mathematically, a location identifier as the third parameter and a time stamp as the fourth parameter, the second identifier vector can be, for example, of the form:

$$\overline{Y} \triangleq BY = B[ID_Y, \{\langle(r_1,s_1),(r_2,s_2)\rangle_j, \ldots \langle(r_M,s_M)\rangle_J\}]$$

where $\overline{Y}$ is the encrypted second identifier vector, Y is the second identifier vector, B is the third party encryption matrix, $ID_Y$ is the second identifier, $r_m$ is the third parameter for the m-th recorded interaction, and $s_m$, is the fourth parameter for the m-th recorded interaction, and $\langle \ldots \rangle_j$ denotes the j-th respective category value into which the third parameter $r_m$ and the fourth parameter $s_m$ were categorized based on the value of the third parameter or the fourth parameter or a combination thereof.

The data processing system 120 can receive from the third party server 160 the second identifier vector that includes the second identifier and a plurality of second combinations of the plurality of third parameters and the plurality fourth parameters. Each of the plurality of second combinations can be generated, for example, based on a hash function or cipher function of each of the plurality of first parameters and each of the plurality of second parameters. Represented mathematically, using a hash function of a location identifier as the third parameter and a time stamp as the fourth parameter, the second identifier vector can be, for example, of the form:

$$\overline{Y} \triangleq BY = B[ID_Y, \{\langle\chi(\lambda_1,\tau_1),\chi(\lambda_2,\tau_2)\rangle_j, \ldots \langle\chi(\lambda_N,\tau_N)\rangle_J\}]$$

where $\overline{Y}$ is the encrypted second identifier vector, Y is the second identifier vector, $ID_Y$ is the second identifier, B is the third party encryption matrix, $\lambda_m$ is the location identifier for the m-th recorded interaction, $\tau_m$ is the time stamp for the m-th recorded interaction, $\langle \ldots \rangle_j$ denotes the j-th respective category value into which the third parameter $\lambda_m$ and the time stamp $\tau_m$ were categorized based on either the location identifier or the time stamp or a combination thereof, and $\chi(\bullet)$ is the hash function. The hash function applied by the third party server 160, $\chi(\bullet)$, can be same or different from the hash function applied by the encryption module 140, $h(\bullet)$. The data processing system 120 can receive the second identifier vector including the second identifier and the plurality of second combinations from the third party server 160.

The first encryption module 145 can encrypt the second identifier vector based on the first encryption, responsive to receiving the second identifier vector from the third party server 160. The first encryption module 145 can encrypt the second identifier, the plurality of third parameters, and the plurality of fourth parameters based on the first encryption. The first encryption module 145 can encrypt the second identifier, the plurality of third parameters, and the plurality of fourth parameters based on the same encryption technique that the first encryption module 145 used to encrypt the first identifier, the plurality of first parameters, and the plurality of second parameters. Represented mathematically, using a hash function of a location identifier as the third parameter and a time stamp as the fourth parameter, the second identifier vector further encrypted based on the first encryption can be, for example, of the form:

$$\overline{Y} \triangleq A\overline{Y} = ABY = AB[\text{ID}_Y, \{\langle \chi(\lambda_1, \tau_1), \chi(\lambda_2, \tau_2)\rangle \langle \ldots \rangle \lambda(\lambda_N, \tau_N)\rangle_J\}]$$

where $\overline{\overline{Y}}$ is the second identifier vector doubly encrypted by the first encryption and the third party encryption, $\overline{Y}$ is the second identifier vector encrypted by the first encryption, Y is the second identifier vector, B is the third party encryption matrix, A is the first encryption matrix, $\text{ID}_Y$ is the second identifier, $\lambda_m$ is the location identifier for the m-th recorded interaction, $\tau_m$ is the time stamp for the m-th recorded interaction, $\langle \ldots \rangle_j$ denotes the j-th respective category value into which the third parameter $\lambda_m$ and the time stamp $\tau_m$ were categorized based on either the location identifier or the time stamp or a combination thereof, and $\chi(\bullet)$ is the hash function.

The bridging module 140 can determine a correlation count between the first identifier vector and the second identifier vector based on a match between some of the plurality of first parameters and some of the plurality of third parameters and between some of the plurality of second parameters and some of the plurality of fourth parameters. The bridging module 140 can determine the correlation count for a respective category of the plurality of categories based on a match between the plurality of first categories and the plurality of second categories versus the plurality of third categories and the plurality of fourth categories. A match can be indicative of an identity, similarity, correlation, or other correspondence between some of the plurality of first parameters and some of the plurality of the third parameters and between some of the plurality of the second parameters and some of the plurality of fourth parameters. For example, the first identifier vector can include a location parameter as a first parameter and a time stamp as a second parameter classified into a category for website requests occurring from San Jose, Calif. at Jul. 15, 2015 between 14:00:00 to 16:00:00. Furthermore, the second identifier vector can include a location parameter as a third parameter and a time stamp as a fourth parameter classified into a category for purchase orders occurring from San Jose, Calif. at Jul. 15, 2015 between 14:00:00 to 16:00:00. In this example, both the first identifier vector and the second identifier vector can have been doubly encrypted based on the same first encryption and the same third party encryption. Since the first encryption and the third party encryption are both commutative, the bridging module 140 can determine that there is a match between the encrypted first parameter and the encrypted third parameter and between the encrypted second parameter and encrypted fourth parameter based on identical match of the ciphers from the categories. Responsive to determining that there is a match between the between the plurality of encrypted first parameters and the plurality of encrypted third parameters and between the plurality of encrypted second parameters and the plurality of encrypted fourth parameters, the bridging module 140 can increment the correlation count.

The bridging module 140 can determine the correlation count based on the some of the plurality of first parameters being within a first margin of the plurality of third parameters and some of the plurality of second parameters being within a second margin of the plurality of fourth parameters. The bridging module 140 can determine the correlation count based on the some of the plurality of first category values being within a category margin of the plurality of third category values and some of the plurality of second category values being within a second margin of the plurality of fourth parameters. The bridging module 140 can determine the correlation count based on some of the plurality of the first parameters being within a threshold distance of some of the plurality of the third parameters and some of the plurality of the second parameters being with a time window. For example, the first identifier vector can include a location parameter as a first parameter and a time stamp as a second parameter classified into a category for website requests occurring from zip code 95630 at Jul. 15, 2015 between 14:00:00 to 16:00:00. Furthermore, the second identifier vector can include a location parameter as a third parameter and a time stamp as a fourth parameter classified into a category for purchase orders occurring from zip code 95763 at Jul. 15, 2015 between 16:00:00 to 18:00:00. The respective category indices of the first identifier vector and the second identifier vector can have been doubly encrypted by the first encryption and the third party encryption. In this example, the threshold distance can be specified as adjacent zip codes and the time stamp can be specified as contiguous time frames. The bridging module 140 can access a list of zip codes from the one or more databases 155 and determine that zip code 95630 and zip code 95763 are adjacent to each other. The bridging module 140 can determine the time frames 14:00:00 to 16:00:00 is contiguous with 16:00;00 to 18:00:00. Responsive to these determinations, the mapping module 135 can determine that there is a match between the first parameter and the third parameter and the second parameter and the fourth parameter, and increment the correlation count for the respective category.

The bridging module 140 can determine that the first identifier corresponds to the second identifier based on the correlation count between the first identifier vector and the second identifier vector being above a determined threshold. The determined threshold can be based on integer, fraction, or percentage, among others. The determine threshold can also be constant, varying, or randomly generated, among others. The bridging module 140 can determine the determined threshold based on the length of the plurality of first parameters, the plurality of second parameters, the plurality of third parameters, and the plurality of fourth parameters. For example, the lengths of the plurality of first parameters and plurality of second parameters each can be 15,000. Furthermore, the lengths of the plurality of third parameters and the plurality of fourth parameters each can be 3,000. In this example, the bridging module 140 can calculate the ratio between the lengths of the plurality of first parameters and plurality of second parameters versus the plurality of third parameters and plurality of fourth parameters. The bridging module 140 can then determine the determined threshold for the correlation count based on a fractional multiplicative factor of the ratio between the lengths. In this example, the bridging module 140 can then determine that the first identifier (e.g., "x345q$") corresponds to the second identifier (e.g., "cr3alq@example_mail.com") based on the correlation count being above the determined threshold.

The bridging module 140 can generate one identifier key for both the first identifier and the second identifier, responsive to determining that the first identifier corresponds to the second identifier. The one identifier key can be, for example, of the form of an alphanumerical string, a randomly generated number, or a character string, among others. The one identifier key can include the first identifier stored in database repository 155 of the data processing system 120. For example, if the first identifier were an account identifier such as an email address, the bridging module 140 can set the email address as the one identifier key. The identifier key can be stored in a map data structure 235 of the data repository 155.

Thus, the bridging module 140 can map the first identifier to a second identifier using a mapping function based on the identifier key. The data processing system 120 can store the mapping function and identifier key for a certain third party server 160 or card transaction processor in database 155. The bridging module 140 can select the mapping function and identifier key for the corresponding card transaction processor 160, and then map first identifiers to second identifiers used by the card transaction processor 160.

The bridging module 140 can use the mapping function to map first identifiers used by the data processing system 120 to second identifiers used by the card transaction processor 160. The bridging module 140 can create a data structure with location determinations made by the location engine 135 that includes the second identifier as shown in Table 1:

TABLE 1

Illustrative location determinations having first identifiers mapped to second identifiers.

| First Identifier | Second Identifier | Location | Timestamp |
|---|---|---|---|
| 123 | ABC | Location_A | Time_1 |
| 456 | DEF | Location_B | Time_2 |

As shown in Table 1, the location engine 135 makes a location determination and associate the location determination with a first identifier. The location determination can include a location (e.g., Location A) and a timestamp (e.g., Time_1). The location can be a bucketized or quantized location. The timestamp can be a bucketized or quantized timestamp. The bridging module 140 can use the mapping function to map the first identifier to the second identifier. The bridging module 140 can create or store the location determinations mapped to the second identifier in the data repository 155. In some cases, the bridging module 140 updates the location data structure to include the second identifier. In some cases, the bridging module 140 replaces the first identifier with the second identifier.

The first encryption module 145 can retrieve the one or more location determinations having the mapped second identifier. The first encryption module 145 can retrieve location determinations by performing a lookup based on location. For example, the first encryption module 145 can perform a lookup in data repository 155 for all location determinations that correspond to Merchant 170A that have a timestamp corresponding to the last 30 days or between Nov. 1, 2015 and Dec. 31, 2015. In another example, the first encryption module 145 can perform a lookup in data repository 155 for all location determinations that correspond to Merchants 170A-N that have a timestamp corresponding to the last 30 days or between Nov. 1, 2015 and Dec. 31, 2015.

The first encryption module 145 can determine a first hash value for each location determination using a first hash function applied to a tuple formed of the second identifier and a timestamp of each location determination. In some cases, the first encryption module 145 can determine a first hash value for each location determination using a first hash function applied to a tuple formed of the second identifier, a timestamp, and a location of each location determination. The first encryption module 145 can apply the first hash function to the one or more fields in order to produce a single hash value. In some cases, the first encryption module 145 can encrypt the first hash value for each location determination using a first encryption protocol to generate a first encrypted data set.

TABLE 2

Example data structure including a hash value generated for each location determination

| Second_Identifier | Location | Timestamp | hash_value = h(second_identifier, location, timestamp) |
|---|---|---|---|
| ABC | Location_A | Time_1 | AA1 |
| DEF | Location_B | Time_2 | DB2 |

Table 2 illustrates the first encryption module 145 generating a hash value for each location determination using a tuple formed from the second identifier, timestamp or location. The first encryption module 145 can then encrypt the hash value to form an encrypted data set as shown in Table 3.

TABLE 3

Example data structure including encrypted hash value

| Hash_value = h(second_identifier, location, timestamp) | First_encrypted_data_set = Encrypted_Hash_Value = G(Hash_value) = G(h(second_identifier, location, timestamp)) |
|---|---|
| AA1 | BB2 |
| DB2 | EC3 |

Table 3 illustrates the first encryption module 145 encrypting the hash values using a first encryption protocol (e.g., G(x)) to generate encrypted hash values. The first encryption protocol can include a commutative encryption protocol. The first encryption module 145 can form the first encrypted data set with the encrypted hash values shown in the second column of table 3.

The first encryption module 145 can store or transmit the first encrypted data set. The first encryption module 145 can store the first encrypted data set in data repository 155 for later processing or use. The data processing system 120 can transmit the first encrypted data set via network 105. For example, the data processing system 120 can include a communication interface 130 designed and constructed to transmit, via the computer network 105, the first encrypted data set to the third party server 160. The third party server 160 may have processed electronic transactions conducted via one or more point of sale devices at a merchant, or the third party server 160 may be otherwise associated with card processor that processed the electronic transactions conducted via a point of sale device.

The communication interface 130 can include one or more communication ports, network ports, a network interface, or network card configured to communicate with network 105 and one or more of the content provider 225, content publisher 215, computing device 110 or third party server 160. The communication interface 130 can establish a secure communication channel via network 105 with third party server 160. The communication interface 130 can establish a secure TCP/IP communication channel. The communication interface 130 can establish a secure communication channel using authentication credentials. The communication interface 130 can push, transmit or otherwise provide the first encrypted data set to the third party server. In some cases, the data processing system 120 (e.g., via communication interface 130) can instruct the third party server 160 to pull the first encrypted data set from the data repository 155.

The third party server 160 can create a second encrypted data set. The third party server 160 (e.g., via second encryption module 165) can create the second encrypted data set. The second encrypted data set can include one or more fields similar to the first encrypted data set created by data processing system 120. For example, the third party server 160 can retrieve, from a database of the third party server 160, information about electronic transactions processed by the third party server 160 or a server associated with third party server 160. The electronic transactions can be stored in a data record as shown in Table 4. Each data record can have a second identifier, a location, or a timestamp. The third party server 160 can create hash values by applying a second hash function to a tuple including a second identifier, location, and timestamp. The second hash function can be the same as the first hash function used by the data processing system 120 to generate the hash values included in the first encrypted data set. The third party server 160 can create a second encrypted data set by encrypting the hash values using a second encryption protocol (e.g., T(x)). The second encryption protocol can be different from the first encryption protocol. The second encryption protocol can be commutative. Thus, the hash functions used by the data processing system 120 and the third party server 160 to generate the hash values can be consistent, while the encryption protocol applied by the data processing system 120 and third party server 160 to the hash values may be different.

Table 4 illustrates electronic transaction data records maintained or managed by third party server 160. The electronic transaction record includes a second identifier field, location field, and timestamp field. The third party server 160 can generate a hash value from the values of these fields for each record, as shown in column. The third party server 160 can use the same or different hash function to generate the hash values. The third party server 160 can then generate a second encrypted data set by encrypting the hash values in column four using a second encryption protocol. The encrypted hash values are illustrated in column five in Table 4. The third party server 160 can create the second encrypted data set from the encrypted hash values illustrated in column 5.

The communication interface 130 can receive, from the third party server 160, the second encrypted data set comprising second hash values generated by a second encryption module for the electronic transactions. The communication interface 130 can forward or otherwise provide the second encrypted data set to the first encryption module 145. The first encryption module 145 can encrypt the second encrypted data set to create or generate a first double encrypted data set. The double encryption can refer to a data set that has been encrypted by two different parties, such as the third party server 160 and the data processing system 120. The first encryption module 145 can encrypt the second encrypted data set using the first encryption protocol (e.g., G(x)) that was also used to encrypt the first encrypted data set. Thus, the first encrypted data set can be: first double encrypted data set=G(second encrypted data set)=G(T(hash value))=G(T(h(second identifier, location, timestamp))).

The third party server 160 (e.g., via second encryption module 165) can also create a double encrypted data set. For example, the third party server 160 can encrypt the first encrypted data set received from the data processing system 120 using the second encryption protocol (e.g., T(x)) to create a second double encrypted data set as follows: Second double encrypted data set=T(first encrypted data set)=T(G(Hash_value))=T(G(h(second_identifier, location, timestamp))). The third party server 160 can provide the second double encrypted data set to the data processing system 120.

The data processing system 120 (e.g., via the communication interface 130) can receive, from the third party server 160 via network 105, the second double encrypted data set. The data processing system 120 can store the second double encrypted data set in data repository 155 for further processing. Table 5 illustrates the first double encrypted data set and the second double encrypted data set.

TABLE 4

Example data record maintained by third party server

| Second_Identifier | Location | Timestamp | hash_value = h(second_identifier, location, timestamp) | Second encrypted data set = second encrypted hash value = T(hash_value) = T(h(second_identifier, location, timestamp)) |
|---|---|---|---|---|
| ABC | Location_A | Time_1 | AA1 | ZZ0 |
| DEF | Location_C | Time_2 | DC2 | CB1 |

TABLE 5

Example first double encrypted data set and
second double encrypted data set

| First double encrypted data set = <br> G(second encrypted data set) = <br> G(T(hash_value)) = <br> G(T(h(second_identifier, location, timestamp))) | Second double encrypted data set = <br> T(first encrypted data set) = <br> T(G(Hash_value)) = <br> T(G(h(second_identifier, location, timestamp))) |
|---|---|
| AA1 | AA1 |
| DC2 | DB2 |

The data processing system 120 can include a tuner 150 designed and to process, analyze or compare the first double encrypted data set with the second double encrypted data set. The tuner 160 can process the first double encrypted data set and the second double encrypted data set to determine one or more metrics, such as a precision metric and a recall metric. The tuner 160 can determine metrics based on a total number of correct location determinations, a total number of location determinations, and a total number of actual location events. Using the metrics, the tuner can adjust a tuning parameter of the location engine based on at least one of the precision metric or the recall metric.

The tuner 150 can determine a total number of correct location determines made by the location engine 135. Since the first double encrypted data set and the second double encrypted data set were both encrypted by the same two commutative encryption protocols (e.g., G(x) and T(x), or first encryption protocol and second encryption protocol), entries in the first encrypted data set and the second encrypted data set can match one another if they correspond to the same hash value generated by applying a hash function to a second identifier and timestamp (or second identifier, timestamp, and location). Thus, the tuner 160 can determine the number of entries in the first double encrypted data set that match entries in the second double encrypted data set. The tuner 150 can determine a matching entry (e.g., an exact or identical match) to indicate a correct location determination.

As illustrated in Table 5, the first record in the first double encrypted data set matches the first record in the second double encrypted data set (e.g., AA1=AA1). The tuner 150 can determine, responsive to the records matching, that this entry corresponds to a correct location determination. The tuner 150 can further determine that the second records do not match (e.g., DC2 does not match DB2). The tuner 150 can determine, responsive to the records not matching, that the second record is an incorrect location. The tuner 150 can determine that the total number of correct location determinations in the second double encrypted data set is 1.

The tuner 150 can determine a total number of location determinations made by the location engine 135 for this data set by determine a number of entries in the second double encrypted data set (e.g., size(second double encrypted data set)). The number of entries can correspond to a number of location determinations made for a certain location during a time interval. For example, the number of location determinations can be 2.

The tuner 150 can determine a total number of actual location events at a certain location using the ground truth data. Since the first double encrypted data set corresponds to hash values generated from electronic transactions processed by the third party server 160, the first double encrypted data set (or second encrypted data set) can be referred to as ground truth data. The tuner 150 can determine the number of actual location events by determine the size of the first double encrypted data set. For example, the number of actual events can be 2.

Upon determining the number of correct location determinations, number of total location determinations, and number of actual location events, the tuner 150 can determine one or more metrics, such as a precision metric and a recall metric as follows:

Precision=number of correct location determinations/
number of total location determinations.

Recall=number of correct location determinations/
number of total actual location events.

For example, the precision metric for the first encrypted data set can be=½=50%; and the recall metric can be: ½=50%. If the number of actual location events observed or recorded by the third party server 160 increased (e.g., 10) but the number of correct location determinations stated the same, the precision metric may stay the same (e.g., ½) while the recall metric may reduce to ¹/₁₀=10%. In another example, if the number of location determinations increased (e.g., 5) while the number of correct location determinations stayed the same, the recall metric may stay the same (e.g., ½), while the precision metric may reduce to ⅕=20%.

In some implementations, the precision metric can be determined as: Precision=number of correct location determinations/(number of total location determinations*electronic transaction rate). The electronic transaction rate can indicate the number of visits to a merchant that result in an electronic transaction. The data processing system 120 can receive the electronic transaction rate from the third party server 160. The data processing system 120 can access a database via network 105 to retrieve the electronic transaction rate. The third party server 160 can determine the electronic transaction rate by dividing the number of electronic transactions that occurred at a merchant during a time interval by the number of visits to the merchant during that time interval. In some cases, the merchant may provide, to the third party server 160, the number of visits to the merchant or the number electronic transactions.

The tuner 150 can adjust a parameter based on the precision metric, the recall metric, or both. The tuner 160 can adjust a parameter to improve performance, precision, or recall of the location engine 135. The tuner 150 can adjust parameters of a content selector by allowing the content select to using the precision or recall metric in an online content item auction to select content items for display on the computing device 110. For example, a content provider 225 may set up a content item campaign with location based content items, and instruct the data processing system 120 to select content items of the content campaign for display on computing devices associated with geographic locations for which the location engine 135 can determine a correct location with a precision metric greater than a precision threshold (or a recall metric greater than a recall threshold).

The tuner 150 can adjust tuning parameters of a location engine 135 such as a time interval for receiving location pings from a computing device, a time interval or frequency of location pings to use to determine a location of a computing device, a source of location information to use (e.g., GPS, WIFI, cell phone triangulation, or beacon), a combination of one or more sources to use, cluster distance threshold, cluster time threshold, number of minimum data points to form a cluster, or number of maximum data points to form a cluster.

For example, the data processing system 120 can adjust the tuning parameters to improve a precision or recall metric. The data processing system 120 can adjust the tuning parameters to reduce resource consumption of the computing device 110 (e.g., battery consumption, processor utilization, storage use, or network data usage). The data processing system 120 can adjust tuning parameters to reduce resource consumption of the data processing system 120 (e.g., reduce processor utilization, storage consumption, or network data usage).

For example, the tuner 150 can determine that the precision metric is above a precision threshold (e.g., 50%, 60%, 70%, 90%, or 95%), or the recall metric is above a recall threshold (e.g., 50%, 60%, 70%, 90%, or 95%). The tuner 150 can determine that since the metrics are above the threshold, that the data processing system 120 can reduce the frequency of location pings received from computing devices 110 while still achieving a satisfactory precision and recall metric. The tuner 150 can determine that since the metrics are above the threshold, that the data processing system 120 can reduce the number of location entries stored in data repository 155 while still achieving a satisfactory precision and recall metric. The tuner 150 can determine that since the metrics are above the threshold, that the data processing system 120 can reduce the number of sources of location information (e.g., GPS, WIFI, cell phone triangulation, or beacon) used to determine a location, or received from a computing device 110, while still achieving a satisfactory precision and recall metric. The tuner 160 can also adjust cluster thresholds to make the cluster processing techniques more efficient (e.g., require more data points to create a cluster in order to filter out smaller clusters).

The tuner 150 can determine that the precision metric is below a precision threshold (e.g., 30%, 40%, 50%, 60%, 70%, 90%, or 95%), or the recall metric is below a recall threshold (e.g., 30%, 40%, 50%, 60%, 70%, 90%, or 95%). Responsive to determining that a metric is below a threshold, the tuner 150 can adjust a tuning parameter to improve the performance of the location engine 135. For example, if the precision metric is below a threshold, the tuner 150 can determine that the location engine 135 is making an unsatisfactory number of incorrect location determinations. Since the precision metric is the number of correct location determinations divided by the total number of location determinations, the tuner 150 can adjust a parameter to facilitate increasing the number of correct determinations, reducing the number of location determinations made, or both.

For example, the tuner 150 can increase a cluster time threshold, a cluster distance threshold, or a minimum number of data points used to form a cluster in order to reduce the total number of location determinations made by the location engine. The tuner 150 can iteratively increase or adjust the threshold. For example, the tuner 150 can adjust one parameter, collect additional data to determine an updated metric, and then re-adjust the parameter or adjust a new parameter if the updated metric is not satisfactory (e.g., the precision metric still falls below the precision threshold). Increasing the cluster time threshold may decrease the number of valid clusters generated by the location engine 135, thereby reducing the number of location determinations made, and increasing the precision metric.

In some cases, the tuner 150 can adjust a tuning parameter to increase the number of correct location determinations. For example, the tuner 150 can adjust a tuning parameter corresponding to a number or type of location sources used by the location engine 135 to make a location determination.

The tuner 150 can instruct the location engine 135 to use at least two location sources (or 3 or 4, for example) to make a location determination. The tuner 150 can instruct the location engine 135 to use certain types of location sources to make the location determination, such as one or more of GPS, wifi triangulation, cellular tower triangulation, beacon technology, or IP address. For example, the tuner 150 can instruct the location engine 135 to use at least two location sources, where one of the two location sources includes cellular tower triangulation.

The tuner 150 can determine the recall metric is less than a threshold. Responsive to the recall metric being less than the threshold, the tuner 150 can increase a frequency of location pings used by the location engine to make the plurality of location determinations. By increasing the frequency of location pings used by the location engine, the tuner 150 can increase the number of correct location determinations because the location engine 135 may have access to higher quality data points or increased number data points.

In some cases, the tuner can decrease a cluster distance threshold used by the location engine to make the plurality of location determinations in order to increase the recall metric. By reducing a cluster distance, the location engine 135 may generate a greater number of location clusters. Generating more location clusters may correspond to an increase in the number of correct location clusters. For example, a first location cluster can correspond to merchant A and a second location cluster can correspond to merchant B that is located adjacent or proximate to merchant A. By reducing the cluster distance threshold, the location engine 135 can distinguish between the two merchants, thus improving the number of correct location determinations made by the location engine 13.

Figure 3:
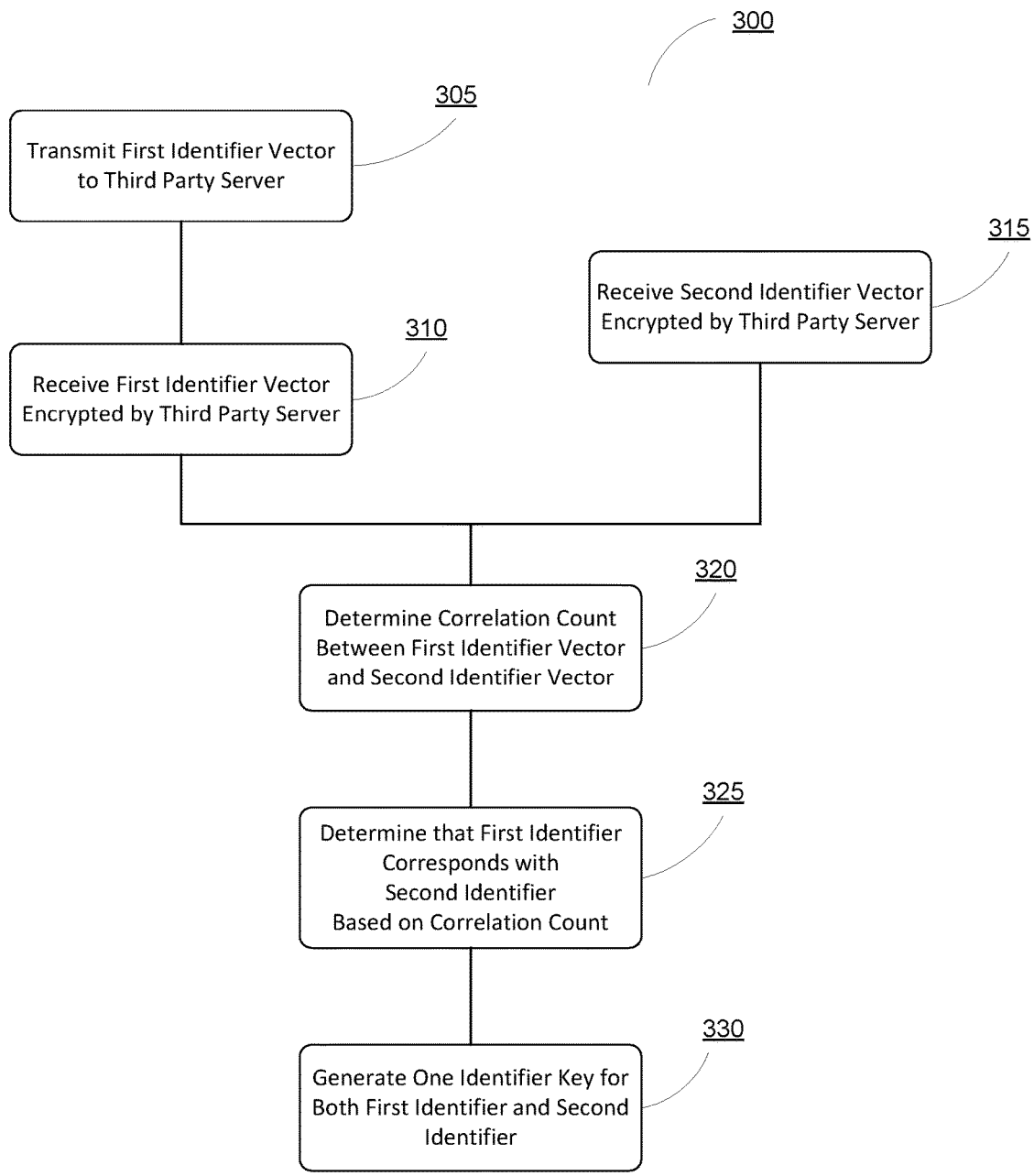
FIG. 3 is a flow diagram depicting a method of matching identifiers between different datasets in accordance with an implementation.

FIG. 3 is a flow diagram depicting an example method 300 of matching identifiers between different datasets, according to an illustrative implementation. The method 300 can be performed to bridge or map a first identifier to a second identifier. The method 300 can be performed to determine the mapping function or key used to map the first identifier to the second identifier. The first identifier can correspond to an identifier generated by a data processing system, and the second identifier can correspond to an identifier generated by a third party server. The functionality described herein with respect to method 300 can be performed or otherwise executed by system 100, system 200, data processing system 120, or any other module or component illustrated in FIG. 1, 2, or 5. The method 300 can be performed or executed at various time intervals, ranging from once every few seconds or minutes to once every predetermined number of days. The method 300 can be performed or executed upon the fulfillment of a conditional, e.g., a condition determined or received by the data processing system 120 such as accumulating a predetermined number of the plurality of first parameters and the plurality of second parameters. The method 300 can be performed responsive to a request from the data processing system 120.

At block 305, the data processing system can transmit a first identifier vector to a third party server. For example, the data processing system can transmit the first identifier vector to the third party server via a network. The data processing system can transmit the first identifier vector, encrypted based on the first encryption. The first identifier vector can include a first identifier, a plurality of first parameters, and a plurality of second parameters. Each of the plurality of first parameters and each of the plurality of second parameters can include log data of the network activity or interactions with the data processing system by the one or more computing device associated with the first identifier.

At block 310, the data processing system can receive the first identifier vector encrypted by the third party server. For example, the data processing system can receive the first identifier vector encrypted by the third party server via the network. The encryption technique applied to the first identifier vector may be a third party encryption associated with the third party server.

At block 315, the data processing system can receive a second identifier vector encrypted by the third party server. For example, the data processing system can receive the second identifier vector from the third party server via the network. The second identifier vector can include a second identifier, a plurality of third parameters, and a plurality of fourth parameters. Each of the plurality of third parameters and each of the plurality of fourth parameters can include log data of the network activity or interactions with the third party server by the one or more computing device associated with the second identifier. The encryption technique applied to the second identifier vector may be a third party encryption associated with the third party server.

At block 320, the data processing system can determine a correlation count between the first identifier vector and the second identifier vector. For example, the data processing system can determine the correlation count between the first identifier vector and the second identifier vector based on determining whether there is a match between some of the plurality of first parameters and some of the plurality of the third parameters and between some of the plurality of second parameters and some of the plurality of fourth parameters. The data processing system can determine that there is a match between the respective parameters, for example, when one of the plurality of first parameters is within a first margin of one of the plurality of second parameters and when one of the plurality of third parameters is within a second margin of one of the plurality of fourth parameters.

At block 325, the data processing system can determine that the first identifier corresponds with the second identifier based on the correlation count. For example, the data processing system can determine that the first identifier corresponds with the second identifier based on the correlation count being above a determined threshold. The data processing system can determine the threshold based on the lengths of the plurality of first parameters, the plurality of second parameters, the plurality of third parameters, and the plurality of fourth parameters.

At block 330, the data processing system can generate one identifier key for both the first identifier and the second identifier. For example, the data processing system can generate the one identifier key for both the first identifier and the second identifier, responsive to determining that the first identifier corresponds with the second identifier. The data processing system can set the first identifier as the one identifier key.

Figure 4:
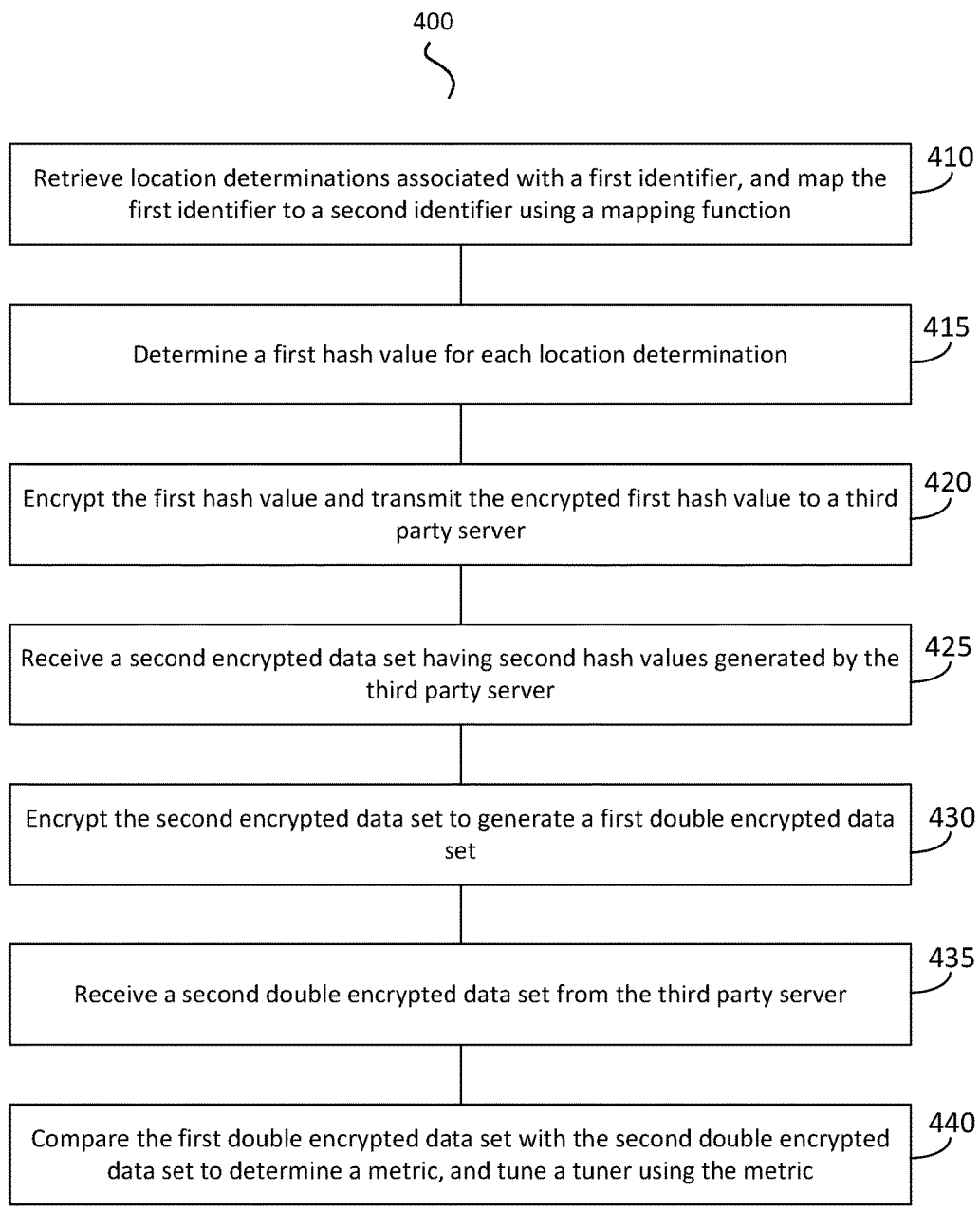
FIG. 4 is a flow diagram depicting a method of cryptographically protecting location data to tune a location engine via a network in accordance with an implementation.

FIG. 4 is a flow diagram depicting a method of cryptographically protecting location data to tune a location engine via a network in accordance with an implementation. The method 400 can be performed via one or more system, component or interface illustrated in FIG. 1, FIG. 2, or FIG. 5, including, e.g., a data processing system, a communication interface, location engine, bridging module, first encryption module, tuner, or data repository. In brief overview, and in some implementations, the method 400 includes a data processing system retrieving location determinations each associated with a first identifier and mapping the first identifier to a second identifier using a mapping function, at 410. At 415, the data processing system determines a first hash value for each location determination. At 420, the data processing system encrypts the first hash values to generate a first encrypted data set, and transmits the first encrypted data set to a third party server. At 425, the data processing system receives a second encrypted data set from the third party server that includes second hash values generated by the third party server. At 430, the data processing system encrypts the second encrypted data set to generate a first double encrypted data set. At 435, the data processing system receives a second double encrypted data set from the third party server. At 440, the data processing system compares the first double encrypted data set with the second double encrypted data set to determine a metric. The data processing system can use the metric to facilitate content selection or improve the performance of a location engine.

Still referring to FIG. 4, and in further detail, the method 400 includes a data processing system retrieving location determinations each associated with a first identifier and mapping the first identifier to a second identifier using a mapping function, at 410. For example, a bridging module of the data processing system can retrieve, from a location database stored in memory, location determinations made by a location engine of the data processing system. Each location determination can be associated with a respective first identifier. The location can correspond to a location of a computing device at a merchant such as a retail store, restaurant, service provider, or other entity. The data processing system can determine the location using location information received from one or more computing devices during a time interval.

The data processing system can perform a lookup in a database to retrieve location determinations that satisfy a criteria. For example, the data processing system can perform a lookup in a database to retrieve location determinations that correspond to a certain merchant, geographic area, city, state, or zip code. The data processing system can perform a lookup to retrieve location determinations that occurred within a time interval or between a first date or timestamp, and a second date or timestamp.

For example, the data processing system can receive geographic coordinates determined by a sensor of a computing device (e.g., a portable computing device). The data processing system can receive the geographic coordinates from a network interface of the portable device, such as a communication interface configured to communicate over network 105. The data processing system can determine, based on the geographic coordinates, a location of the portable device. The data processing system can store the location of the portable in a location database for future processing.

In some cases, the data processing system can receive location information for the portable device that was determined using multiple location sources. For example, the data processing system can receive location information determined by the portable device via at least two of a global positioning sensor of the portable device, a wireless network interface of the portable device, cell phone tower triangulation, or a beacon. In some cases, the portable device can analyze and synthesize the location information as determined by the two or more sources, and provide, to the data processing system, the location determination. In some cases, the data processing system can instruct the portable device to use a certain number of available location sources, or a certain type of location source.

In some cases, the portable device can provide separate location information as determined by each source, and the data processing system can analyze the location information to make a location determination. The location engine can determine, based on the location information from each of the sources, a location of the portable device. For example, the location engine of the data processing system can compare location data points received from the multiple sources and weight the location data points to determine a centroid location. For example, the location engine can determine to weight GPS data points lower than beacon or cell phone tower triangulation data points. By weighting GPS data points lower, the data processing system can cause the cell phone tower triangulation data points to drive the location determination.

The data processing system (e.g., via a bridging module) can map each respective first identifier to a respective second identifier using a mapping function. For example, the data processing system can use a mapping function to map the first identifier to the second identifier. The second identifier can correspond to a common identifier used by a third party server and also known to the data processing system. The data processing system can use the mapping function or bridging technique to convert, translate, or otherwise map the first identifier to the second identifier.

At 415, the data processing system determines a first hash value for each location determination. The data processing system (e.g., via a first encryption module) can determine a first hash value for each location determination using a first hash function applied to a tuple formed of the second identifier and a timestamp of each location determination. In some cases, the data processing system can determine a first hash value for each location determination using a first hash function applied to a tuple formed of the second identifier, a timestamp, and a location of each location determination. The timestamp or the location can be bucketized or quantized. For example, the timestamp can be bucketized or rounded to the nearest 10 seconds, 30 seconds, 60 seconds, or 2 minutes. The location can be bucketized or rounded to a latitude and longitude precision, address, map tile, map quadrant, radius, 25 square meters, 50 square meters, or 100 square meters. The data processing system can apply a predetermined quantization to the timestamp of each location determination prior to determination of the hash value for each location determination.

At 420, the data processing system encrypts the first hash values to generate a first encrypted data set, and transmits the first encrypted data set to a third party server. The data processing system (e.g., the first encryption module) can encrypt the first hash value for each location determination using a first encryption protocol to generate a first encrypted data set. The data processing system can apply the same encryption protocol to each hash value, or a different encryption protocol to some of the hash values.

The data processing system (e.g., a communication interface) can transmit the first encrypted data set to a third party server. For example, the third party server can include or be associated with one or more servers that process electronic transactions conducted via one or more point of sale devices at a merchant. The third party server can provide ground truth data that the data processing system can use to determine performance metrics.

At 425, the data processing system receives a second encrypted data set from the third party server that includes second hash values generated by the third party server. The third party server can generate the second hash values by applying a hash function to a second identifier and a timestamp. The third party server can generate the second hash values by applying a hash function to a second identifier, a timestamp, and a location. The third party server can generate the second hash values the same way the data processing system generates the first hash values. For example, the data processing system can use the same hash function to generate the first hash values that the third party server uses to generate the second hash values. The data processing system and third party server can also use the same second identifier. The data processing system and third party server can also use the same bucket size or quantization for the timestamp or the location.

For example, the third party server can apply the predetermined quantization to the time stamp of each of the electronic transactions prior to generation of the second hash values. In some cases, the data processing system can provide the predetermined quantization to the third party server. In some cases, the data processing system can receive the predetermined quantization from the third party server and use the predetermined quantization to generate the first hash values.

The third party server can generate the second encrypted data set by applying a second encryption protocol to the second hash values. The second encryption protocol can be different from the first encryption protocol. For example, the second encryption protocol and the first encryption protocol can use different algorithms, keys, or parameters. The data processing system and the third party server may conceal the type of encryption protocol used to generate the encrypted data set. The first and second encryption protocol can both be commutative encryption protocols. The first and second encryption protocols can have the commutative property if the order in which the encryption protocol is applied does not change the result. For example, $G(T(h(x)))=T(G(h(x)))$, where G is the first encryption protocol and T is the second encryption protocol.

At 430, the data processing system encrypts the second encrypted data set to generate a first double encrypted data set. The data processing system (e.g., via the first encryption module) can use the first encryption protocol to encrypt the second encrypted data set received from the third party server to generate a first double encrypted data set. The first double encrypted data set can correspond to the ground truth data because it corresponds to electronic transactions.

At 435, the data processing system receives a second double encrypted data set from the third party server. The data processing system (e.g., via the communication interface) can receive the second double encrypted data. The third party server (e.g., via the second encryption module) can generate the second double encrypted data set by applying the second encryption protocol to the first encrypted data set that was transmitted by the data processing system to the third party server.

At 440, the data processing system compares the first double encrypted data set with the second double encrypted data set to determine a metric. The data processing system can use the metric to facilitate content selection or improve the performance of a location engine. The data processing system (e.g., via a tuner) can compare the first double encrypted data set with the second double encrypted data set to determine a precision metric and a recall metric based on a total number of correct location determinations, a total number of location determinations, and a total number of actual location events. The tuner can adjust a tuning parameter of the location engine based on at least one of the precision metric or the recall metric.

To determine the precision metric, the data processing system can determine the total number of correct location determinations based on a number of entries of the second double encrypted data set that match entries of the first double encrypted data set. The match can be an exact match such that the two entries are identical. The data processing system can determine the total number of location determinations based on a number of entries of the second double encrypted data set. The data processing system can determine the precision metric by dividing the total number of correct location determinations by the total number of location determinations. In some cases, the data processing system can determine the precision metric by dividing the total number of correct location determinations by a product of the total number of location determinations and an electronic transaction rate. The electronic transaction rate can refer to a number of transactions that occur per number of visits to the merchant (e.g., 1 out of 20; 5%, or 3/100).

To determine the recall metric, the data processing system can determine the total number of actual location events based on a number of entries of the first double encrypted data set. The data processing system can determine the recall metric by dividing the total number of correct location determinations by the total number of actual location events.

The data processing system can use the performance metric to adjust parameters of the location engine or for other purposes. For example, the data processing system can generate a report with performance metrics for one or more merchants or geographic areas. For example, the data processing system can determine that a densely populated city has poor performance metrics due to the number of merchants located adjacent one another. In another example, the data processing system can determine that the location engine performs poorly for location determinations in an indoor mall with multiple retail stores. This may be because there is no GPS access, poor or no cell phone reception, lack of location sources, or inaccurate location sources (e.g., GPS signals bouncing off of objects causing incorrect time readings). The data processing system, responsive to identifying a poor performance metric, can determine techniques to either improve the performance or adjust function of the data processing system.

For example, the data processing system can improve performance by instructing merchants to provide or configure a WIFI router at the merchant location to improve location accuracy. In another example, the data processing system can adjust content selection to account for low quality location. For example, the data processing system can determine that the location engine cannot determine with sufficient confidence whether a computing device is in a coffee shop or a tax provider office. Since advertisements selected based on a coffee shop location may be different from advertisements selected based on a tax provider office, the data processing system can determine to select the advertisement without using a location criteria. In some cases, the data processing system can determine to select an advertisement that matches both location criteria.

Thus, systems and methods of the present disclosure can cryptographically protect location data transferred between a data processing system and a third party server in order to determine a performance metric, and tune a component or function of the data processing system to improve the component or function. For example, the data processing system can use the performance metric to improve precision or recall of the location engine, improve content selection, or reduce resource consumption of a computing device or data processing system.

Figure 5:
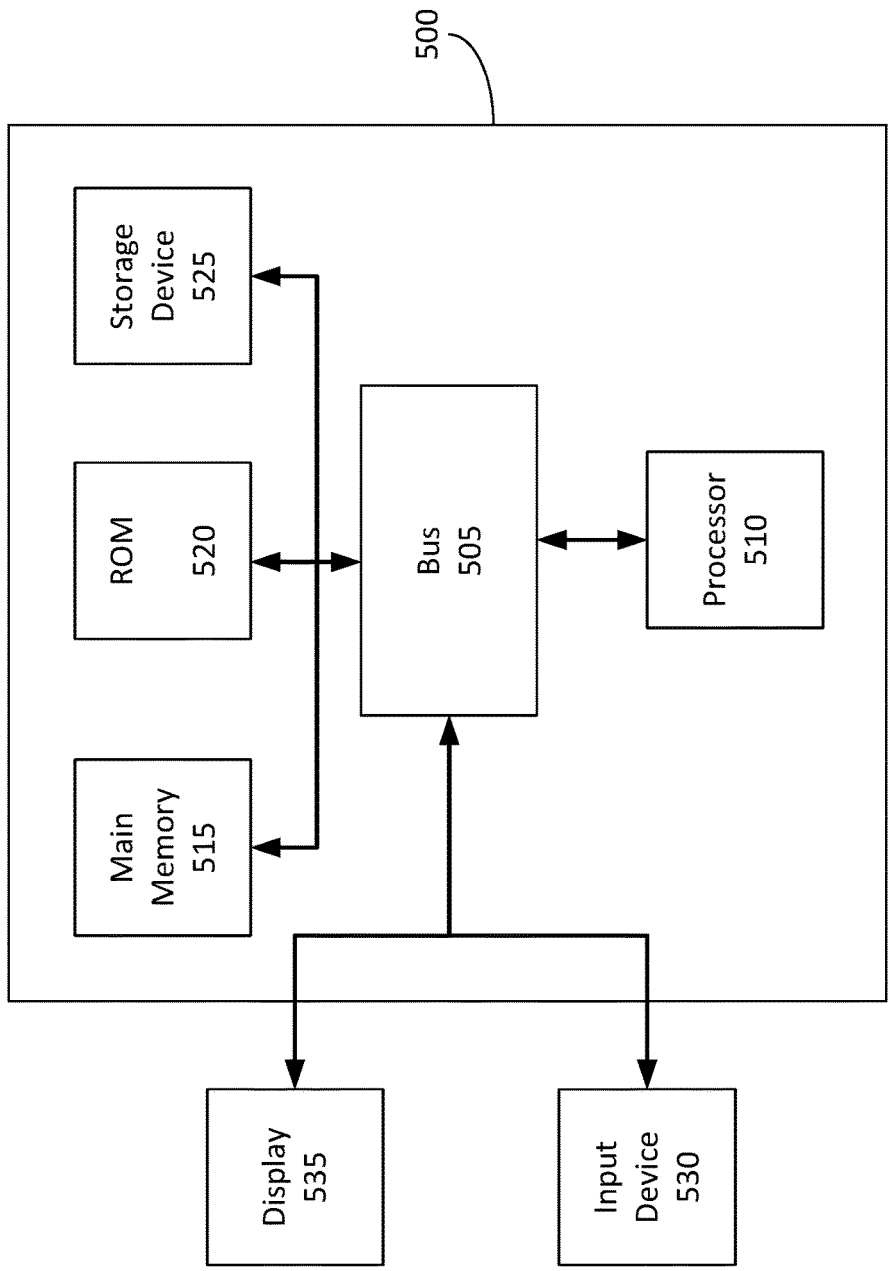
FIG. 5 is a block diagram illustrating a general architecture for a computer system that may be employed to implement various elements of the systems shown in FIGS. 1 and 2, and the methods shown in FIGS. 3 and 4, in accordance with an implementation.

FIG. 5 is a block diagram of a computer system 500 in accordance with an illustrative implementation. The computer system or computing device 500 can be used to implement the system 100, system 200, content provider 225, computing device 110, content publisher 215, data processing system 120, communication interface 130, location engine 135, bridging module 140, first encryption module 145, tuner 150, data repository 155, third party server 160, second encryption module 165, point of sale device 115, or transaction card 125. The computing system 500 includes a bus 505 or other communication component for communicating information and a processor 510 or processing circuit coupled to the bus 505 for processing information. The computing system 500 can also include one or more processors 510 or processing circuits coupled to the bus for processing information. The computing system 500 also includes main memory 515, such as a random access memory (RAM) or other dynamic storage device, coupled to the bus 505 for storing information, and instructions to be executed by the processor 510. Main memory 515 can also be used for storing position information, temporary variables, or other intermediate information during execution of instructions by the processor 510. The computing system 500 may further include a read only memory (ROM) 520 or other static storage device coupled to the bus 505 for storing static information and instructions for the processor 510. A storage device 525, such as a solid state device, magnetic disk or optical disk, is coupled to the bus 505 for persistently storing information and instructions.

The computing system 500 may be coupled via the bus 505 to a display 535, such as a liquid crystal display, or active matrix display, for displaying information to a user. An input device 530, such as a keyboard including alphanumeric and other keys, may be coupled to the bus 505 for communicating information and command selections to the processor 510. The input device 530 can include a touch screen display 535. The input device 530 can also include a cursor control, such as a mouse, a trackball, or cursor direction keys, for communicating direction information and command selections to the processor 510 and for controlling cursor movement on the display 535.

The processes, systems and methods described herein can be implemented by the computing system 500 in response to the processor 510 executing an arrangement of instructions contained in main memory 515. Such instructions can be read into main memory 515 from another computer-readable medium, such as the storage device 525. Execution of the arrangement of instructions contained in main memory 515 causes the computing system 500 to perform the illustrative processes described herein. One or more processors in a multi-processing arrangement may also be employed to execute the instructions contained in main memory 515. In alternative implementations, hard-wired circuitry may be used in place of or in combination with software instructions to effect illustrative implementations. Thus, implementations are not limited to any specific combination of hardware circuitry and software.

Although an example computing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources.

The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, subprograms, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Although an example computing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular implementations of the subject matter have been described. Other implementations are within the scope of the following claims. While operations are depicted in the drawings in a particular order, this should not be understood as requiring that such operations be performed in the particular order shown or in sequential order, or that all illustrated operations are required to be performed. Actions described herein can be performed in a different order. In addition, the processes depicted in the accompanying figures do not necessarily require the particular order shown, or sequential order, to achieve desirable results. In certain implementations, multitasking and parallel processing may be advantageous.

The separation of various system components does not require separation in all implementations, and the described program components can be included in a single hardware or software product. For example, the bridging module 140 and the first encryption module 145 can be a single module, a logic device having one or more processing circuits, or part of an online content item placement system.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementation," "an alternate implementation," "various implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A system that cryptographically protects location data transferred between a plurality of servers via a computer network to tune a location engine, comprising:
   a data processing system comprising one or more processors and memory;
   a bridging module executed by the one or more processors of the data processing system to retrieve, from a location database stored in the memory, a plurality of location determinations made by the location engine of the data processing system, each location determination associated with a respective first identifier;

the bridging module configured to map each respective first identifier to a respective second identifier using a mapping function;

a first encryption module executed by the one or more processors to determine a first hash value for each location determination using a first hash function applied to a tuple formed of the second identifier and a timestamp of each location determination;

the first encryption module configured to encrypt the first hash value for each location determination using a first encryption protocol to generate a first encrypted data set;

a communication interface of the data processing system to transmit, via the computer network, the first encrypted data set to one or more servers configured to process electronic transactions;

the communication interface configured to receive, from the one or more servers, a second encrypted data set comprising second hash values generated by a second encryption module for the electronic transactions, each of the second hash values generated by the second encryption module via application of a second hash function to a tuple formed of an identifier and a timestamp of each of the electronic transactions, the second encrypted data set encrypted by the second encryption module with a second encryption protocol, wherein the first encryption protocol and the second encryption protocol are commutative encryption protocols;

the first encryption module configured to use the first encryption protocol to encrypt the second encrypted data set received from the one or more servers to generate a first double encrypted data set;

the communication interface configured to receive, from the one or more servers, a second double encrypted data set generated by the second encryption module via application of the second encryption protocol to the first encrypted data set transmitted by the data processing system to the one or more servers;

a tuner executed by the one or more processors to compare the first double encrypted data set with the second double encrypted data set to determine a precision metric and a recall metric based on a total number of correct location determinations, a total number of location determinations, and a total number of actual location events; and the tuner configured to adjust a tuning parameter of the location engine based on at least one of the precision metric or the recall metric.

2. The system of claim 1, comprising the location engine configured to:
receive, via a network interface of a portable device, geographic coordinates determined by a sensor of the portable device;
determine, based on the geographic coordinates, a location of the portable device; and
store, in the location database, the location of the portable device.

3. The system of claim 1, comprising:
the communication interface configured to receive, via a network interface of a portable device, location information determined via at least two of a global positioning sensor of the portable device, a wireless network interface of the portable device, cell phone tower triangulation, or a beacon;
the location engine configured to determine, based on the location information, a location of the portable device; and
the location engine configured to store, in the location database, the location of the portable device.

4. The system of claim 1, comprising the tuner configured to:
determine the total number of correct location determinations based on a number of entries of the second double encrypted data set that match entries of the first double encrypted data set;
determine the total number of location determinations based on a number of entries of the second double encrypted data set; and
determine the precision metric by dividing the total number of correct location determinations by the total number of location determinations.

5. The system of claim 1, comprising the tuner configured to:
determine the total number of correct location determinations based on a number of entries of the second double encrypted data set that match entries of the first double encrypted data set;
determine the total number of location determinations based on a number of entries of the second double encrypted data set; and
determine the precision metric by dividing the total number of correct location determinations by a product of the total number of location determinations and an electronic transaction rate.

6. The system of claim 1, comprising the tuner configured to:
determine the total number of correct location determinations based on a number of entries of the second double encrypted data set that match entries of the first double encrypted data set;
determine the total number of actual location events based on a number of entries of the first double encrypted data set; and
determine the recall metric by dividing the total number of correct location determinations by the total number of actual location events.

7. The system of claim 1, comprising the first encryption module configured to:
apply a predetermined quantization to the timestamp of each location determination prior to determination of the hash value for each location determination.

8. The system of claim 7, wherein the second encrypted data set comprising the second hash values is generated by the second encryption module configured to apply the predetermined quantization to the time stamp of each of the electronic transactions prior to generation of the second hash values.

9. The system of claim 7, comprising the first encryption module configured to:
receive the predetermined quantization from the one or more servers.

10. The system of claim 1, comprising the tuner configured to:
determine the precision metric is less than a threshold; and
adjust, responsive to the precision metric less than the threshold, the tuning parameter of the location engine to cause the location engine to increase a minimum number or quality of location information sources used by the location engine to make the plurality of location determinations.

11. The system of claim 1, comprising the tuner configured to:
determine the precision metric is less than a threshold; and
adjust, responsive to the precision metric less than the threshold, the tuning parameter of the location engine to increase a cluster time threshold used by the location engine to make the plurality of location determinations.

12. The system of claim 1, comprising the tuner configured to:
determine the recall metric is less than a threshold; and
adjust, responsive to the recall metric less than the threshold, the tuning parameter of the location engine to cause the location engine to increase a frequency of location pings used by the location engine to make the plurality of location determinations.

13. The system of claim 1, comprising the tuner to:
determine the recall metric is less than a threshold; and
adjust, responsive to the recall metric less than the threshold, the tuning parameter of the location engine to decrease a cluster distance threshold used by the location engine to make the plurality of location determinations.

14. A method of cryptographically protecting location data transferred between a plurality of servers via a computer network to tune a location engine, comprising:
retrieving, by a bridging module executed by one or more processors of a data processing system, from a location database stored in memory, a plurality of location determinations made by the location engine of the data processing system, each location determination associated with a respective first identifier;
mapping, by the bridging module, each respective first identifier to a respective second identifier using a mapping function;
determining, by a first encryption module executed by the one or more processors, a first hash value for each location determination using a first hash function applied to a tuple formed of the second identifier and a timestamp of each location determination;
encrypting, by the first encryption module, the first hash value for each location determination using a first encryption protocol to generate a first encrypted data set;
transmitting, by a communication interface of the data processing system, via the computer network, the first encrypted data set to one or more servers configured to process electronic transactions;
receiving, by the communication interface, from the one or more servers, a second encrypted data set comprising second hash values generated by a second encryption module for the electronic transactions, each of the second hash values generated by the second encryption module via application of a second hash function to a tuple formed of an identifier and a timestamp of each of the electronic transactions, the second encrypted data set encrypted by the second encryption module with a second encryption protocol, wherein the first encryption protocol and the second encryption protocol are commutative encryption protocols;
using, by the first encryption module, the first encryption protocol to encrypt the second encrypted data set received from the one or more servers to generate a first double encrypted data set;
receiving, by the communication interface, from the one or more servers, a second double encrypted data set generated by the second encryption module via application of the second encryption protocol to the first encrypted data set transmitted by the data processing system to the one or more servers;
comparing, by a tuner executed by the one or more processors, the first double encrypted data set with the second double encrypted data set to determine a precision metric and a recall metric based on a total number of correct location determinations, a total number of location determinations, and a total number of actual location events; and
adjusting, by the tuner, a tuning parameter of the location engine based on at least one of the precision metric or the recall metric.

15. The method of claim 14, comprising:
receiving, by the data processing system via a network interface of a portable device, geographic coordinates determined by a sensor of the portable device;
determining, by the data processing system, based on the geographic coordinates, a location of the portable device; and
storing, by the data processing system in the location database, the location of the portable device.

16. The method of claim 14, comprising:
receiving, by the data processing system via a network interface of a portable device, location information determined via at least two of a global positioning sensor of the portable device, a wireless network interface of the portable device, cell phone tower triangulation, or a beacon;
determine, by the data processing system based on the location information, a location of the portable device; and
storing, by the data processing system in the location database, the location of the portable device.

17. The method of claim 14, comprising:
determining, by the data processing system, the total number of correct location determinations based on a number of entries of the second double encrypted data set that match entries of the first double encrypted data set;
determining, by the data processing system, the total number of location determinations based on a number of entries of the second double encrypted data set; and
determining, by the data processing system, the precision metric by dividing the total number of correct location determinations by the total number of location determinations.

18. The method of claim 14, comprising:
determining, by the data processing system, the total number of correct location determinations based on a number of entries of the second double encrypted data set that match entries of the first double encrypted data set;
determining, by the data processing system, the total number of location determinations based on a number of entries of the second double encrypted data set; and
determining, by the data processing system, the precision metric by dividing the total number of correct location determinations by a product of the total number of location determinations and an electronic transaction rate.

19. The method of claim 14, comprising:
determining, by the data processing system, the total number of correct location determinations based on a number of entries of the second double encrypted data set that match entries of the first double encrypted data set;

determining, by the data processing system, the total number of actual location events based on a number of entries of the first double encrypted data set; and determining, by the data processing system, the recall metric by dividing the total number of correct location determinations by the total number of actual location events.

20. The method of claim 14, comprising:

applying, by the data processing system, a predetermined quantization to the timestamp of each location determination prior to determination of the hash value for each location determination.

* * * * *